(12) United States Patent
Kim et al.

(10) Patent No.: US 9,094,645 B2
(45) Date of Patent: Jul. 28, 2015

(54) METHOD FOR PROCESSING SOUND SOURCE IN TERMINAL AND TERMINAL USING THE SAME

(75) Inventors: Taesu Kim, Seocho-gu (KR); Seungil Kim, Seocho-gu (KR); Hyejeong Jeon, Seocho-gu (KR); Gunho Song, Seocho-gu (KR); Sangwhan Moon, Seocho-gu (KR)

(73) Assignee: LG ELECTRONICS INC., Seoul (KR)

( * ) Notice: Subject to any disclaimer, the term of this patent is extended or adjusted under 35 U.S.C. 154(b) by 543 days.

(21) Appl. No.: 12/839,338

(22) Filed: Jul. 19, 2010

(65) Prior Publication Data

US 2011/0013075 A1    Jan. 20, 2011

(30) Foreign Application Priority Data

Jul. 17, 2009  (KR) .................. 10-2009-0065503
Aug. 19, 2009  (KR) .................. 10-2009-0076766

(51) Int. Cl.
*H04N 5/228* (2006.01)
*H04N 5/60* (2006.01)
*H04N 7/14* (2006.01)
*H04N 21/414* (2011.01)
*H04N 21/4788* (2011.01)
*H04R 3/00* (2006.01)

(52) U.S. Cl.
CPC .............. *H04N 5/602* (2013.01); *H04N 7/147* (2013.01); *H04N 21/41407* (2013.01); *H04N 21/4788* (2013.01); *H04R 3/005* (2013.01)

(58) Field of Classification Search
USPC ............................... 348/222.1; 381/310, 306
See application file for complete search history.

(56) References Cited

U.S. PATENT DOCUMENTS

| | | | | |
|---|---|---|---|---|
| 6,008,808 A * | 12/1999 | Almeida et al. | ............... | 715/767 |
| 7,035,418 B1 * | 4/2006 | Okuno et al. | ................. | 381/310 |
| 7,843,486 B1 * | 11/2010 | Blair et al. | ................. | 348/14.01 |
| 2002/0075295 A1 * | 6/2002 | Stentz et al. | ................... | 345/727 |
| 2009/0063976 A1 * | 3/2009 | Bull et al. | ...................... | 715/716 |
| 2010/0123785 A1 * | 5/2010 | Chen et al. | ............... | 348/207.11 |
| 2010/0146445 A1 * | 6/2010 | Kraut | ............. | 715/821 |
| 2011/0007175 A1 * | 1/2011 | Fujita et al. | ................ | 348/222.1 |
| 2011/0029920 A1 * | 2/2011 | Kang | ............................ | 715/810 |
| 2011/0142253 A1 * | 6/2011 | Hata et al. | ....................... | 381/92 |

FOREIGN PATENT DOCUMENTS

| | | |
|---|---|---|
| JP | 2003-189273 | 7/2003 |
| JP | 2004-208188 | 7/2004 |
| JP | 2010074827 A * | 4/2010 |
| KR | 10-2009-0059437 | 6/2009 |
| KR | 2009-59437 | 6/2009 |
| KR | 2009-0059437 A | 6/2009 |
| WO | WO 2010021154 A1 * | 2/2010 |

* cited by examiner

*Primary Examiner* — Gary C Vieaux
(74) *Attorney, Agent, or Firm* — McKenna Long & Aldridge LLP

(57) ABSTRACT

The present disclosure relates to a method for processing sound source in terminal capable of receiving an outside sound source through at least two microphones and displaying a position of the outside sound source on a display unit, and a terminal using the same, wherein the terminal includes: at least two microphones configured to receive an outside sound source; a display unit configured to display a predetermined data; and a controller configured to obtain position information of the sound source using at least one of an amplitude, a phase and a period of the outside sound source received from the two microphones, and controllably display the position information of the sound source on a display unit.

18 Claims, 19 Drawing Sheets

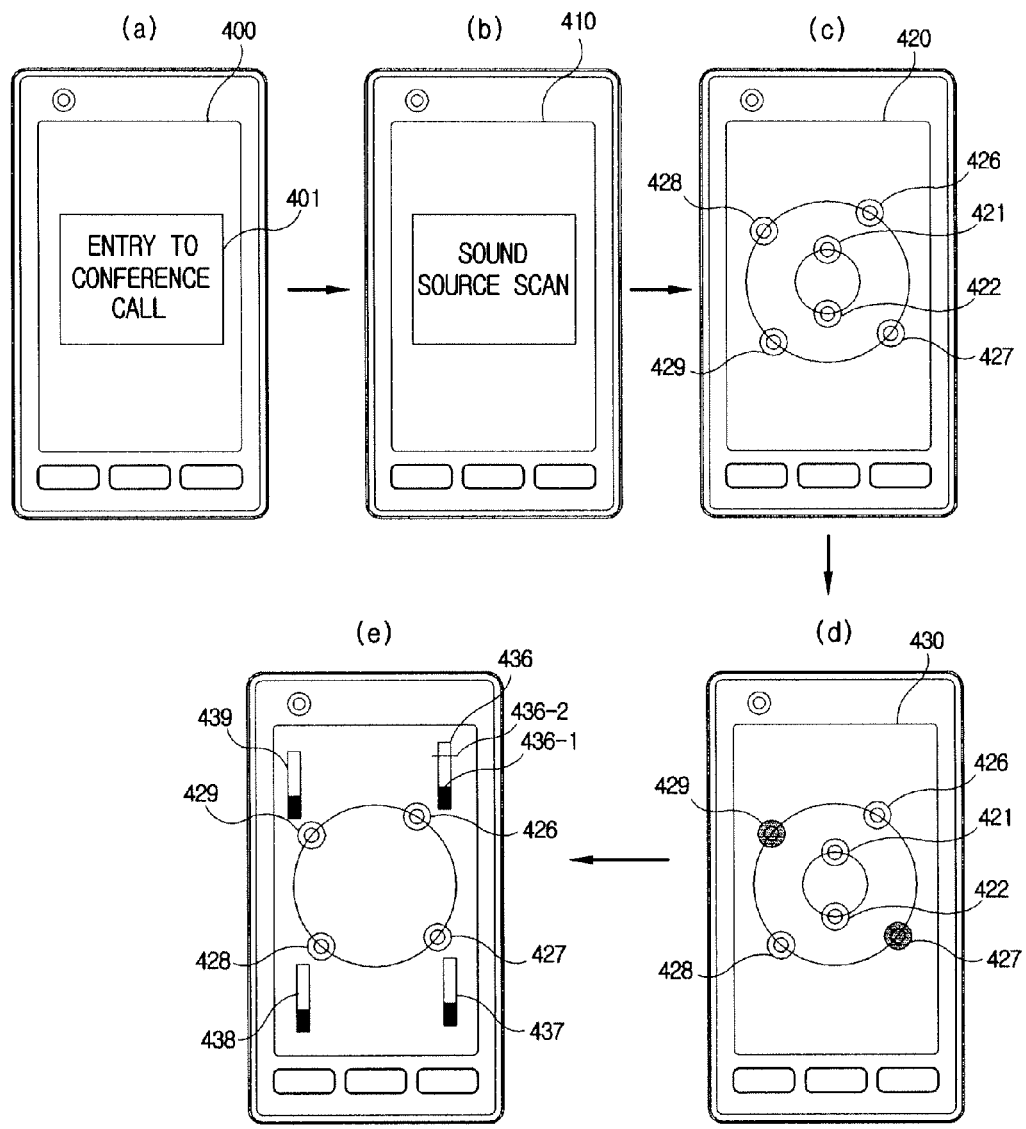

FIG. 14
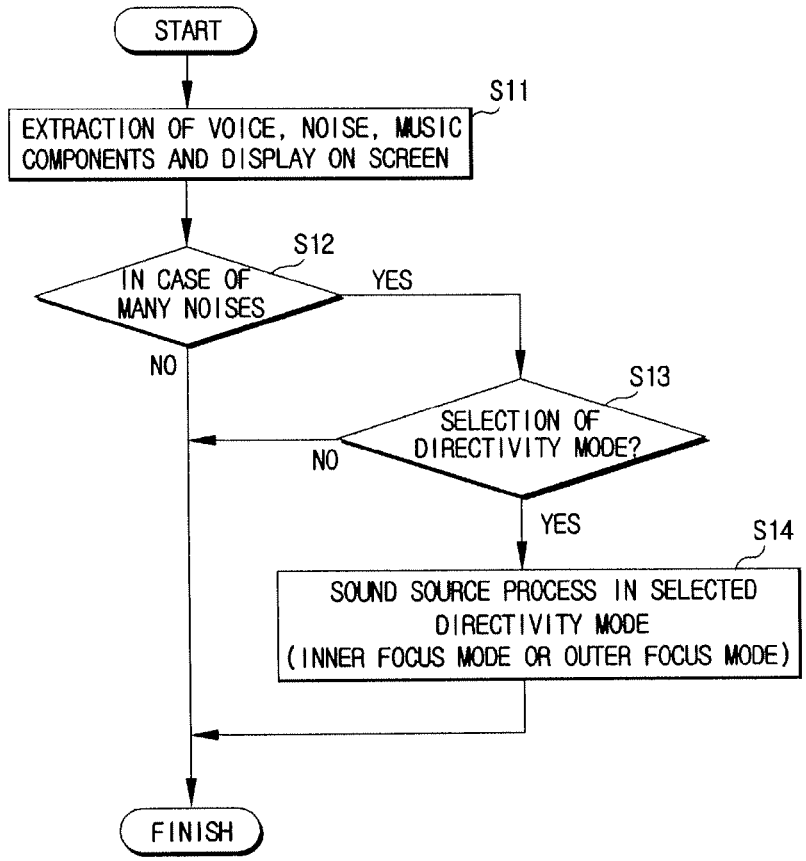
FIG. 15
(a)
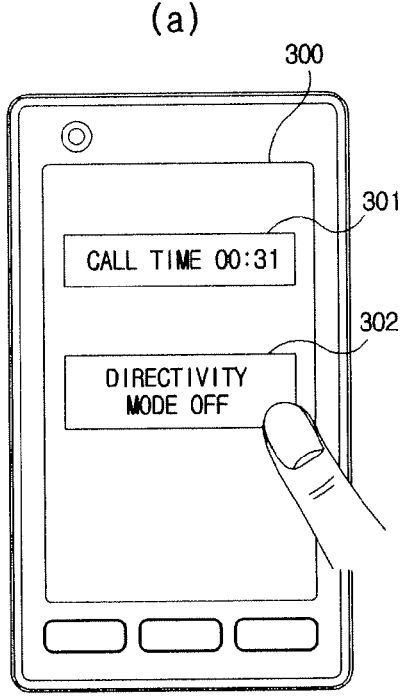
(b)
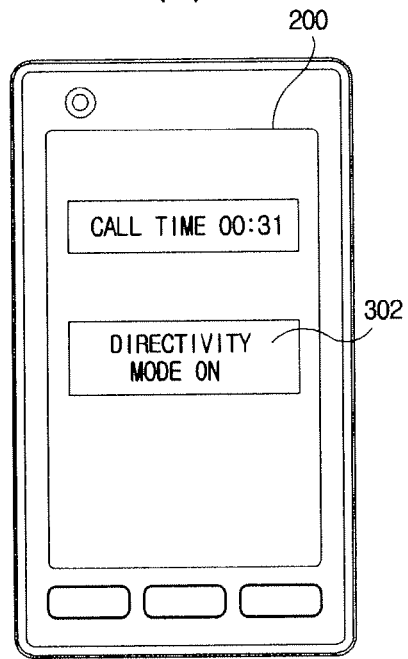

FIG. 21
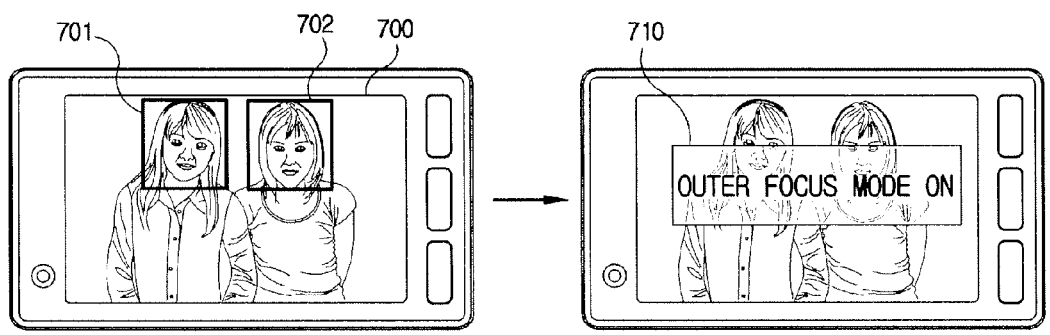
(a)
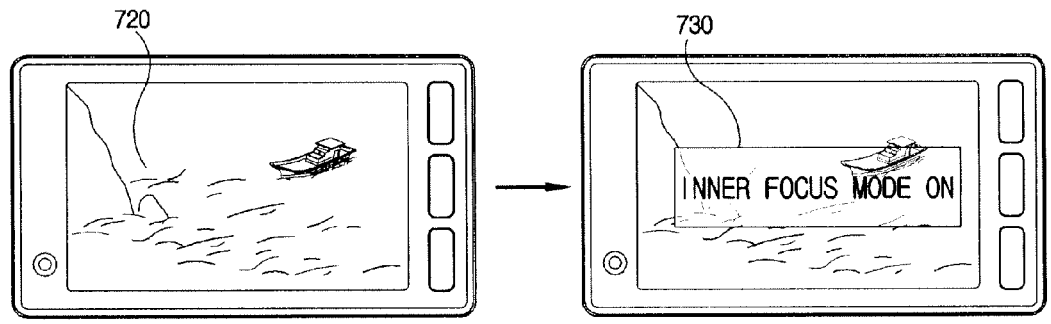
(b)

METHOD FOR PROCESSING SOUND SOURCE IN TERMINAL AND TERMINAL USING THE SAME

CROSS-REFERENCE TO RELATED APPLICATION

This application claims the benefit of the Korean Patent Application Nos. 10-2009-0065503, filed on Jul. 17, 2009, and 10-2009-0076766, filed on Aug. 19, 2009, which are hereby incorporated by reference as if fully set forth herein.

FIELD OF THE DISCLOSURE

The present disclosure relates to a method for processing sound source in terminal capable of receiving an outside sound source through at least two microphones and displaying a position of the outside sound source on a display unit, and a terminal using the same.

DISCUSSION OF THE RELATED ART

In the ongoing drive toward development of electronic technologies, a variety of electronic devices have been developed. Concomitant with the recent fast development of electronic technologies, convergence of electronic devices have been progressed at a good pace. A terminal is one of the electronic devices that have recently drawn interest from consumers.

As functions of the terminal are diversified, the terminal is implemented as a multimedia player provided with composite functions such as photographing of photos or moving pictures, playback of music or moving picture files, game play, broadcast reception and the like, for example.

To support and increase the terminal functions, the improvement of structural parts and/or software parts of the terminal may be considered.

Furthermore, in a case sound or image is replayed or reproduced in the multimedia player, technologies have evolved into conveniently modulating the sound or editing the image responsive to a user selection. It was difficult to communicate with the other party if there are too many noises about a terminal in a case the terminal is a mobile terminal.

SUMMARY OF THE DISCLOSURE

Accordingly, an object of the present disclosure is to provide a method for processing a sound source in a terminal capable of receiving an outside sound source through at least two microphones and displaying a position of the outside sound source on a display unit, whereby a user is provided with an option of sound source storage. Furthermore, another object is to allow a terminal user to obtain a desired sound in higher quality.

In one general aspect of the present disclosure, there is provided a method for processing a sound source in a terminal, the method comprising: obtaining position information of an outside sound source; displaying a sound source storage icon capable of setting up the position information on a display unit; and selectively obtaining the outside sound source using the sound source storage icon.

In some exemplary embodiments of the present disclosure, the step of obtaining position information of an outside sound source may comprise: receiving the outside sound source through at least two microphones; and determining the position information of the outside sound source using at least one of amplitude difference, a phase difference, a period difference and a time difference of sound received from the two microphones.

In some exemplary embodiments of the present disclosure, the step of obtaining position information of an outside sound source may comprise: further obtaining an image corresponding to the outside sound source through a camera of the terminal; recognizing a face included in the image using a face recognition program; and determining position information of the outside sound source in further consideration of a position of the face.

In some exemplary embodiments of the present disclosure, the step of obtaining position information of an outside sound source may comprise: obtaining position information of the outside sound source inputted to the microphones using at least two microphones; displaying a sound source transmission icon representing the outside sound source on the display unit; and transmitting only the selected sound source through the wireless communication unit of the terminal by selecting the sound source transmission icon, based on the position information of the outside sound source.

In some exemplary embodiments of the present disclosure, the method may comprise: reproducing the outside sound source through an audio output module of the terminal and displaying the sound source reproduction icon on the display unit of the terminal based on the position information; and discontinuing the output of the selected sound source if the sound source reproduction icon is selected, or reproducing only the selected sound source.

In another general aspect of the present disclosure, there is provided a method for processing a sound source in a terminal, the method comprising: receiving an outside sound source through at least two microphones; selecting at least one of a directivity mode, a normal mode, and a noise removal mode from a sound source process program for controlling the microphones, and obtaining the outside sound source responsive to the selected mode; and displaying on a display unit a microphone mode identifier for displaying the selected mode.

In some exemplary embodiments of the present disclosure, the directivity mode may include an inner focus mode and an outer focus mode.

In some exemplary embodiments of the present disclosure, the method may further comprise: analyzing the obtained outside sound source and displaying the analyzed sound source in microphone reception sensitivity bar; and using the microphone reception sensitivity bar to control an amplification degree of the obtained sound source.

In some exemplary embodiments of the present disclosure, the step of selecting at least one of a directivity mode, a normal mode, and a noise removal mode from a sound source program for controlling the microphones, and obtaining the outside sound source responsive to the selected mode may comprise: detecting a user gesture by a detection sensor formed at the terminal; and selecting the noise removal mode if the user gesture is detected, and obtaining the outside sound source responsive to the noise removal mode.

In some exemplary embodiments of the present disclosure, the step of selecting at least one of a directivity mode, a normal mode, and a noise removal mode from a sound source program for controlling the microphones, and obtaining the outside sound source responsive to the selected mode may comprise: obtaining a moving picture image included in the outside sound source; executing a face recognition program pre-stored in a memory of the terminal to confirm whether a face is available in the moving picture image; and selecting the directivity mode if it is confirmed that the face is available in the moving picture image.

In still another general aspect of the present disclosure, there is provided a terminal, comprising: at least two microphones configured to receive an outside sound source; a display unit configured to display a predetermined data; and a controller configured to obtain position information of the sound source using at least one of an amplitude, a phase and a period of the outside sound source received from the two microphones, and controllably display the position information of the sound source on a display unit.

In some exemplary embodiments of the present disclosure, the terminal may further comprise a memory configured to store a face recognition program; and a camera, wherein the controller may obtain an image corresponding to the outside sound source through the camera, use the face recognition program pre-stored in the memory to recognize a face included in the image and determine the position information in consideration of a position of the recognized face.

In some exemplary embodiments of the present disclosure, the controller may display a sound source storage icon indicating the outside sound source on the display unit based on the position information, and controllably obtain only the selected sound source or only the not-selected sound source if a select signal to the sound source storage icon is generated.

In some exemplary embodiments of the present disclosure, the terminal may further comprise a sound source output module configured to output the outside sound source, wherein the controller may display a sound source reproduction icon on the display unit based on the position information of the outputted sound source, and discontinue the output of the selected sound source or reproduce only the selected sound source.

In some exemplary embodiments of the present disclosure, the terminal may further comprise a wireless communication unit configured to communicate with other terminals, wherein the controller may obtain the position information of the outside sound source and display a sound source transmission icon representing the position information on the display unit if a conference call mode is entered, and transmit the outside sound source to other terminals only the selected sound source through the wireless communication unit, or transmit only the not-selected sound source to the other terminals if the sound source transmission icon is selected.

In some exemplary embodiments of the present disclosure, the terminal may further comprise a memory configured to store a sound source process program including any one of a directivity mode, a normal mode and a noise removal mode, wherein the controller may obtain the outside sound source by selecting at least any one of the directivity mode, the normal mode and the noise removal mode and controlling the two microphones responsive to the selected mode, and display on the display unit a microphone mode identifier configured to display the selected mode.

In some exemplary embodiments of the present disclosure, the controller may analyze the obtained outside sound source and display the analyzed sound source on the display unit in a microphone reception sensitivity bar, and use the microphone reception sensitivity bar to control the volume of the obtained sound source.

In some exemplary embodiments of the present disclosure, the directivity mode may include an inner focus mode and an outer focus mode.

In some exemplary embodiments of the present disclosure, the terminal may further comprise a camera unit configured to obtain a moving picture image, wherein the memory may further store a face recognition program, and wherein the controller may obtain a moving picture image included with the outside sound source from the camera unit, execute the face recognition program of the memory to confirm whether a face is available in the moving picture image and controllably select the directivity mode if the face is confirmed to be available in the moving picture image.

In some exemplary embodiments of the present disclosure, the terminal may further comprise a movement detection sensor configured to detect a user gesture, wherein the controller may obtain the outside sound source responsive to the noise removal mode if the noise removal mode is selected.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 2b is a rear perspective view of the terminal shown in FIG. 2a;

FIG. 10 is an image diagram for illustrating a first example applied with a method for conference call of a terminal according to a second exemplary embodiment of the present disclosure;

FIG. 14 is a flowchart for illustrating a method for obtaining a sound source in a terminal according to a modification of a third exemplary embodiment of the present disclosure;

FIG. 15 is a schematic view illustrating an example applied to an audio communication according to a third exemplary embodiment of the present disclosure;

FIG. 21 is a schematic view illustrating an example applied to an image recording according to a fifth exemplary embodiment of the present disclosure.

DETAILED DESCRIPTION

Now, a terminal related to the present disclosure will be described in detail with reference to the accompanying drawings. The suffixes 'module', 'unit' and 'part' may be used for elements in order to facilitate the disclosure. Significant meanings or roles may not be given to the suffixes themselves and it is understood that the 'module', 'unit' and 'part' may be used together or interchangeably.

Embodiments of the present disclosure may be applicable to various types of terminals. Examples of such terminals may include mobile terminals as well as stationary terminals, such as mobile phones, user equipment, smart phones, DTV, computers, digital broadcast terminals, personal digital assistants (PDAs), portable multimedia players (PMPs), digital TV, navigators and/or desk top computers.

A further description may be provided with regard to a terminal, although such teachings may apply equally to other types of terminals.

Figure 1:
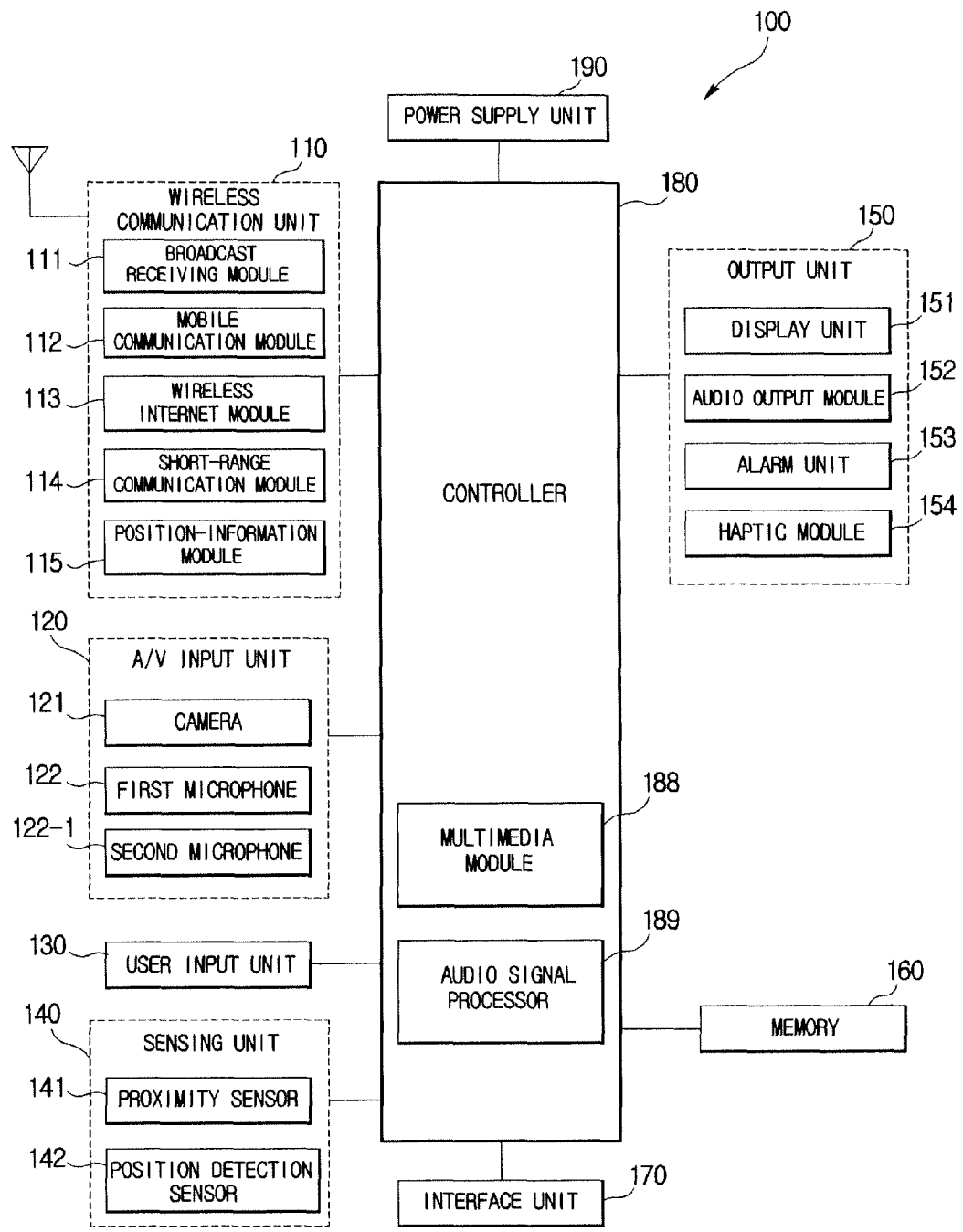
FIG. 1 is a block diagram of a terminal in accordance with an exemplary embodiment of the present disclosure.

FIG. 1 is a block diagram of a terminal in accordance with an exemplary embodiment. Other embodiments and arrangements may also be provided. FIG. 1 shows a terminal 100 having various components, although other components may also be used. More or fewer components may be alternatively implemented.

FIG. 1 shows that the terminal 100 includes a wireless communication unit 110, an audio/video (A/V) input unit 120, a user input unit 130, a sensing unit 140, an output unit 150, a memory 160, an interface unit 170, a controller 180 and a power supply unit 190.

The wireless communication unit 110 may be configured with several components and/or modules. The wireless communication unit 110 may include a broadcast receiving module 111, a mobile communication module 112, a wireless Internet module 113, a short-range communication module 114 and a position-location module 115.

The broadcast receiving module 111 may receive a broadcast signal and/or broadcast associated information from an external broadcast managing entity via a broadcast channel. The broadcast channel may include a satellite channel and a terrestrial channel. The broadcast managing entity may refer to a system that transmits a broadcast signal and/or broadcast associated information.

At least two broadcast receiving modules 111 may be provided in the terminal 100 to pursue simultaneous reception of at least two broadcast channels or facilitation of broadcast channel switching.

Examples of broadcast associated information may include information associated with a broadcast channel, a broadcast program, a broadcast service provider, etc. For example, broadcast associated information may include an electronic program guide (EPG) of digital multimedia broadcasting (DMB) and an electronic service guide (ESG) of digital video broadcast-handheld (DVB-H).

The broadcast signal may be a TV broadcast signal, a radio broadcast signal, and/or a data broadcast signal. The broadcast signal may further include a broadcast signal combined with a TV or radio broadcast signal.

The broadcast receiving module 111 may receive broadcast signals transmitted from various types of broadcast systems. As a non-limiting example, the broadcasting systems may include digital multimedia broadcasting-terrestrial (DMB-T), digital multimedia broadcasting-satellite (DMB-S), digital video broadcast-handheld (DVB-H), a data broadcasting system known as media forward link only (Media-FLO®) and integrated services digital broadcast-terrestrial (ISDB-T). The receiving of multicast signals may also be provided. Data received by the broadcast receiving module 111 may be stored in the memory 160, for example.

The mobile communication module 112 may communicate wireless signals with one or more network entities (e.g. a base station or Node-B). The signals may represent audio, video, multimedia, control signaling, and data, etc.

The wireless Internet module 113 may support Internet access for the mobile terminal 100. This wireless Internet module 113 may be internally or externally coupled to the mobile terminal 100. Suitable technologies for wireless Internet may include, but are not limited to, WLAN (Wireless LAN)(Wi-Fi), Wibro (Wireless broadband), Wimax (World Interoperability for Microwave Access), and/or HSDPA (High Speed Downlink Packet Access). The wireless Internet module 113 may be replaced with a wire Internet module in non-mobile terminals. The wireless Internet module 113 and the wire Internet module may be referred to as an Internet module.

The short-range communication module 114 may facilitate short-range communications. Suitable technologies for short-range communication may include, but are not limited to, radio frequency identification (RFID), infrared data association (IrDA), ultra-wideband (UWB), as well as networking technologies such as Bluetooth and ZigBee.

The position-location module 115 may identify or otherwise obtain a location of the terminal 100. The position-location module 115 may be provided using global positioning system (GPS) components that cooperate with associated satellites, network components, and/or combinations thereof.

Referring to FIG. 1, the audio/video (A/V) input unit 120 may provide audio or video signal input to the terminal 100. The A/V input unit 120 may include a camera 121 and a microphone 122. The camera 121 may receive and process image frames of still pictures and/or video. Two or more cameras 121 may be provided according to use environment.

The microphone 122 may receive an external audio signal while the mobile terminal is in a particular mode, such as a phone call mode, a recording mode and/or a sound (voice) recognition mode. The received audio signal may then be processed and converted into audio digital data. The processed audio data may be converted to a transmittable format to a base station via the mobile communication module 112 and outputted.

The terminal 100, and in particular the microphone 112, may include a noise removing algorithm (or noise canceling algorithm) to remove noise generated in the course of receiving the external audio signal. Data generated by the A/V input unit 120 may be stored in the memory 160, utilized by the output unit 150, and/or transmitted via one or more modules of the wireless communication unit 110.

At least two or more microphones may be provided. Sound source received from the at least two microphones is processed by a sound source program stored in the memory 160, whereby better quality of sound source may be obtained. The sound process program may include a directivity mode, a normal mode and a noise removal mode. Alternatively, one directivity microphone may be provided.

The user input unit 130 may generate input data responsive to user manipulation of an associated input device or devices. Examples of such devices may include a keypad, a dome switch, a touchpad (e.g., static pressure/capacitance), a jog wheel and/or a jog switch.

The sensing unit 140 may provide status measurements of various aspects of the terminal 100. For example, the sensing unit 140 may detect an open/close status (or state) of the terminal 100, a relative positioning of components (e.g., a display and a keypad) of the terminal 100, a change of position of the terminal 100 or a component of the terminal 100, a presence or absence of user contact with the terminal 100, and/or an orientation or acceleration/deceleration of the terminal 100.

The terminal 100 may be configured as a slide-type mobile terminal. In such a configuration, the sensing unit 140 may sense whether a sliding portion of the mobile terminal 100 is open or closed. The sensing unit 140 may also sense presence or absence of power provided by the power supply unit 190, presence or absence of a coupling or other connection between the interface unit 170 and an external device, etc.

The sensing unit 140 may include a proximity sensor 141 and a posture detection sensor 142.

The output unit 150 may generate an output relevant to a sight sense, an auditory sense, a tactile sense and/or the like. The output unit 150 may include a display unit 151, an audio output module 152, an alarm unit 153, a haptic module 154 and/or the like.

The display unit 151 may display (output) information processed by the terminal 100. For example, in case that the terminal is in a call mode, the display unit 151 may display a user interface (UI) or a graphic user interface (GUI) associated with the call. If the mobile terminal 100 is in a video communication mode or a photograph mode, the display unit 151 may display a photographed and/or received picture, a UI or a GUI.

The display unit 151 may include at least one of a liquid crystal display (LCD), a thin film transistor liquid crystal display (TFT LCD), an organic light-emitting diode (OLED), a flexible display, and a 3-dimensional display.

The display unit 151 may have a transparent or light-transmissive type configuration to enable an external environment to be seen through. This may be called a transparent display. A transparent OLED (TOLED) may be an example of a transparent display. A backside structure of the display unit 151 may also have the light-transmissive type configuration. In this configuration, a user may see an object located behind the terminal body through the area occupied by the display unit 151 of the terminal body.

At least two display units 151 may also be provided. For example, a plurality of display units may be provided on a single face of the terminal 100 by being built in one body or spaced apart from the single face. Alternatively, each of a plurality of displays may be provided on different faces of the terminal 100.

In a case the display unit 151 and a sensor for detecting touch action (hereafter a touch sensor) are constructed in a mutual-layered structure (hereafter a touch screen), the display unit 151 may be used as an input device as well as an output device. For example, the touch sensor may include a touch film, a touch sheet, a touchpad and/or the like.

The touch sensor may convert a pressure applied to a specific portion of the display unit 151 or a variation of electrostatic capacity generated from a specific portion of the display unit 151 to an electric input signal. The touch sensor may detect a pressure of a touch as well as a position and size of the touch.

In a case a touch input is provided to the touch sensor, signal(s) corresponding to the touch input may be transferred to a touch controller. The touch controller may process the signal(s) and then transfer corresponding data to the controller 180. The controller 180 may therefore know which portion of the display unit 151 is touched.

FIG. 1 shows that the proximity sensor 141 can be provided within the mobile terminal 100 enclosed by the touch-screen or around the touch screen. The proximity sensor 141 may detect a presence or non-presence of an object approaching a prescribed detecting surface or an object existing around the proximity sensor 141 using an electromagnetic field strength or infrared ray without mechanical contact. The proximity sensor 141 may have a longer durability than the contact type sensor and may also have a greater usage than the contact type sensor.

The proximity sensor 141 may include one of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and/or the like. If the touch screen is an electrostatic type, the proximity sensor 141 may detect proximity of a pointer using a variation of an electric field according to the proximity of the pointer. In this case, the touch screen (touch sensor) may be classified into the proximity sensor.

An action in which a pointer approaches the touch screen without contacting the touch screen may be called a proximity touch. An action in which a pointer actually touches the touch screen may be called a contact touch. The location of the touch screen proximity-touched by the pointer may be the position of the pointer that vertically opposes the touch screen when the pointer performs the proximity touch.

The proximity sensor 141 may detect a proximity touch and/or a proximity touch pattern (e.g., a proximity touch distance, proximity touch duration, a proximity touch position, a proximity touch shift state, etc.). Information corresponding to the detected proximity touch action and/or the detected proximity touch pattern may be outputted to the touch screen.

The posture detection sensor (142), which is a sensor configured to detect a posture change of the terminal, may include a gyro sensor and an acceleration sensor.

The audio output module 152 may output audio data that is received from the wireless communication unit 110 in a call signal reception mode, a call mode or a recording mode, a voice recognition mode, a broadcast receiving mode and/or the like. The audio output module 152 may output audio data stored in the memory 160. The audio output module 152 may output an audio signal relevant to a function (e.g., a call signal receiving sound, a message receiving sound, etc.) performed by the mobile terminal 100. The audio output module 152 may include a receiver, a speaker, a buzzer and/or the like.

The alarm unit 153 may output a signal for announcing an event occurrence of the terminal 100. An event occurring in the terminal 100 may include one of a call signal reception, a message reception, a key signal input, a touch input and/or the like. The alarm unit 153 may output a signal for announcing an event occurrence by way of vibration or the like as well as a video signal or an audio signal. The video signal may be outputted via the display unit 151. The audio signal may be outputted via the audio output module 152. The display unit 151 or the audio output module 152 may be classified as part of the alarm unit 153.

The haptic module 154 may bring about various haptic effects that can be sensed by a user. Vibration is a representative example for the haptic effect brought about by the haptic module 154. Strength and pattern of the vibration generated from the haptic module 154 may be controllable. For example, vibrations differing from each other may be outputted in a manner of being synthesized together or may be sequentially outputted.

The haptic module 154 may generate various haptic effects including a vibration, an effect caused by such a stimulus as a pin array vertically moving against a contact skin surface, a jet power of air via outlet, a suction power of air via inlet, a skim on a skin surface, a contact of an electrode, an electrostatic power and the like, and/or an effect by hot/cold sense reproduction using an endothermic or exothermic device as well as the vibration.

The haptic module 154 may provide the haptic effect via direct contact. The haptic module 154 may enable a user to experience the haptic effect via muscular sense of a finger, an arm and/or the like. Two or more haptic modules 154 may be provided according to a configuration of the terminal 100.

The memory 160 may store a program for operations of the controller 180. The memory 160 may temporarily store input/output data (e.g., phonebook, message, still picture, moving picture, etc.). The memory 160 may store data of vibration and sound in various patterns outputted in case of a touch input to the touch screen.

The memory 160 may include at least one of a flash memory, a hard disk, a multimedia card micro type memory, a card type memory (e.g., SD memory, XD memory, etc.), a random access memory (RAM), a static random access memory (SRAM), a read-only memory (ROM), an electrically erasable programmable read-only memory, a programmable read-only memory, a magnetic memory, a magnetic disk, an optical disk, and/or the like. The terminal 100 may operate in association with a web storage that performs a storage function of the memory 160 in the Internet.

The interface unit 170 may play a role as a passage to external devices connected to the terminal 100. The interface unit 170 may receive data from an external device. The interface unit 170 may be supplied with a power and then the power may be delivered to elements within the terminal 100. The interface unit 170 may enable data to be transferred to an external device from an inside of the terminal 100. The interface unit 170 may include a wire/wireless headset port, an external charger port, a wire/wireless data port, a memory card port, a port for coupling to a device having an identity module, an audio input/output (I/O) port, a video input/output (I/O) port, an earphone port and/or the like.

The identity module may be a chip or card that stores various kinds of information for authenticating use of the terminal 100. The identify module may include a user identity module (UIM), a subscriber identity module (SIM), a universal subscriber identity module (USIM) and/or the like. A device provided with the above identity module (hereafter an identity device) may be manufactured in the form of a smart card. The identity device may be connected to the terminal 100 via the port.

The interface unit 170 may play a role as a passage for supplying a power to the mobile terminal 100 from a cradle that is connected to the mobile terminal 100. The interface unit 170 may play a role as a passage for delivering various command signals, which are inputted from the cradle by a user, to the mobile terminal 100. Various command signals inputted from the cradle or the power may work as a signal for recognizing that the mobile terminal 100 is correctly loaded in the cradle.

The controller 180 may control overall operations of the terminal 100. For example, the controller 180 may perform control and processing relevant to a voice call, a data communication, a video conference and/or the like. The controller 180 may have a multimedia module 188 and/or audio signal processor 189 for multimedia playback. The multimedia module 188 may be implemented within the controller 180 or may be configured separate from the controller 180.

The controller 180 may perform pattern recognizing processing for recognizing a handwriting input performed on the touch screen as a character an/or recognizing a picture drawing input performed on the touch screen as an image.

The power supply unit 190 may receive an external or internal power and then supply the power required for operations of the respective elements under control of the controller 180.

Embodiments of the present disclosure explained in the following description may be implemented within a recording medium that can be read by a computer or a computer-like device using software, hardware or combination thereof.

According to the hardware implementation, arrangements and embodiments may be implemented using at least one of application specific integrated circuits (ASICs), digital signal processors (DSPs), digital signal processing devices DSPDs), programmable logic devices (PLDs), field programmable gate arrays (FPGAs), processors, controllers, microcontrollers, microprocessors and electrical units for performing other functions. In some cases, embodiments may be implemented by the controller 180.

For a software implementation, arrangements and embodiments described herein may be implemented with separate software modules, such as procedures and functions, each of which may perform one or more of the functions and operations described herein. Software codes may be implemented with a software application written in any suitable programming language and may be stored in memory such as the memory 160, and may be executed by a controller or processor, such as the controller 180.

Figure 2A:
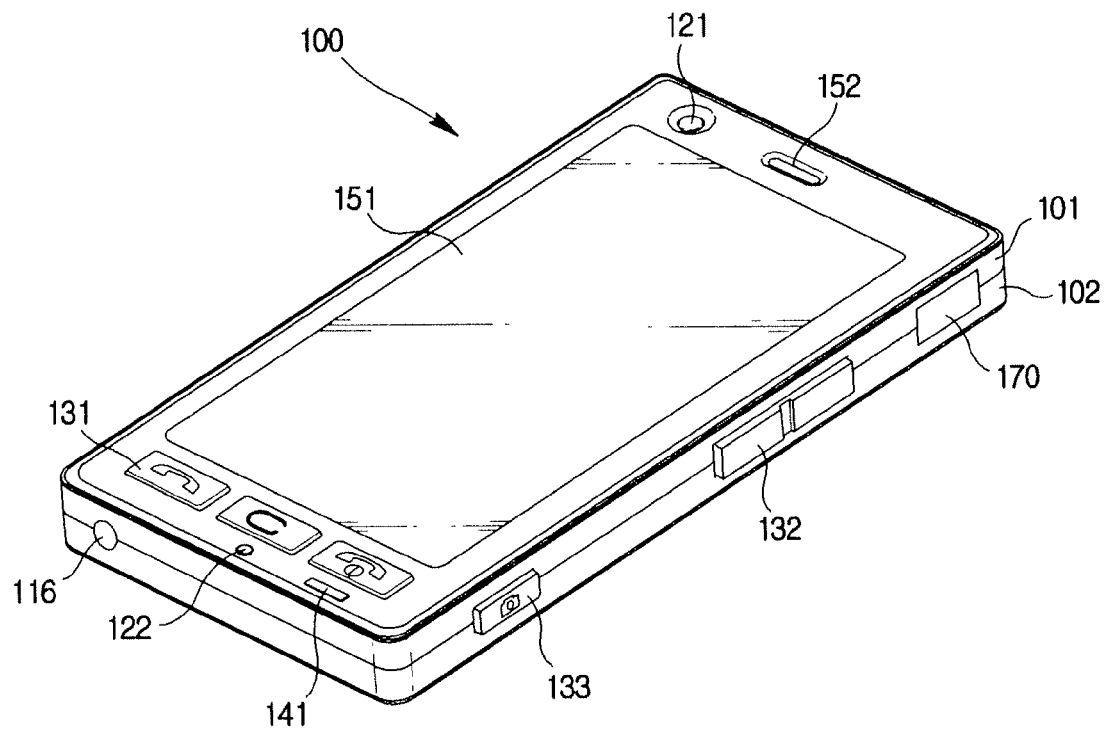
FIG. 2a is a front perspective view of a terminal according to an exemplary embodiment of the present disclosure.

FIG. 2a is a front-view of a mobile terminal according to an example embodiment. Other embodiments, configurations and arrangements may also be provided.

As shown in FIG. 2a, the disclosed terminal 100 is configured with a bar type terminal body. The terminal 100 is not limited thereto. Embodiments of the terminal may be implemented in a variety of different configurations. Examples of such configuration may include a folder-type, a slide-type, a bar-type, a rotational-type, a swing-type and/or combinations thereof.

The body may include a case (casing, housing, cover, etc.) that forms an exterior of the terminal. The case may be divided into a front case 101 and a rear case 102. Various electric/electronic parts may be provided in a space between the front case 101 and the rear case 102. A middle case may be further provided between the front case 101 and the rear case 102.

The cases may be formed by injection molding of synthetic resin or may be formed of metal substance such as stainless steel (STS), titanium (Ti) or the like, for example.

The display unit 151, the audio output unit 152, the camera 121, user input units 130/131/132, the microphone 122, the interface unit 170 and the like may be provided on the terminal body, and more particularly on the front case 101.

The display unit 151 may occupy most of a main face of the front case 101. The audio output module 152 and the camera 121 may be provided at an area adjacent to one end portion of the display unit 151, while the user input unit 131 and the microphone 122 may be provided at another area adjacent to the other end portion of the display unit 151. The user input unit 132 and the interface unit 170 may be provided on lateral sides of the front and rear cases 101 and 102.

The user input unit 130 may receive a command for controlling an operation of the terminal 100. The user input unit 130 may include a plurality of manipulating units 131 and 132. The manipulating units 131 and 132 may be generally called a manipulating portion and may adopt any mechanism of a tactile manner that enables a user to perform a manipulation action by experiencing a tactile feeling.

Contents inputted by the first manipulating unit 131 or the second manipulating unit 132 may be diversely set. For example, a command such as start, end, scroll and/or the like may be inputted to the first manipulating unit 131. A command for a volume adjustment of sound outputted from the audio output unit 152, a command for switching to a touch recognizing mode of the display unit 151 or the like may be inputted to the second manipulating unit 132.

Figure 2B:
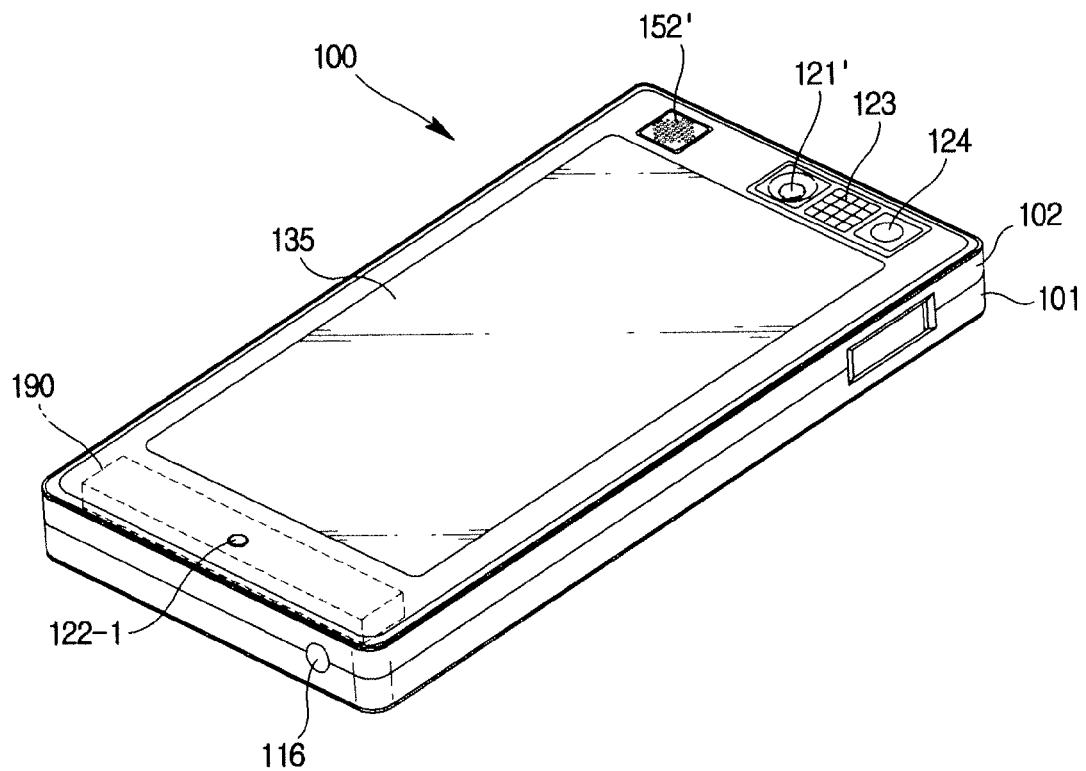

FIG. 2b is a perspective diagram of a backside of the terminal shown in FIG. 2a. Other embodiments, configurations and arrangements may also be provided.

As shown in FIG. 2b, a camera 121' may be additionally provided on a backside of the terminal body, and more particularly on the rear case 102. The camera 121' may have a photographing direction that is substantially opposite to a photographing direction of the camera 121 (shown in FIG. 2a) and may have pixels differing from pixels of the camera 121.

For example, the camera 121 may have a lower number of pixels to capture and transmit a picture of user face for a video call, while the camera 121' may have a greater number of pixels for capturing a general subject for photography without transmitting the captured subject. Each of the cameras 121 and 121' may be installed on the terminal body to be rotated and/or popped up.

A flash 123 and a mirror 124 may be additionally provided adjacent to the camera 121'. The flash 123 may project light toward a subject in case of photographing the subject using the camera 121'. If a user attempts to take a picture of the user (self-photography) using the camera 121', the mirror 124 may enable the user to view a user's face reflected by the mirror 124.

A microphone 122-1 may be additionally provided at a rear surface of the terminal. In a case at least two or more microphones are provided, sound received from each microphone may be signal-processed by a sound process program to enable obtainment of excellent quality of sound.

An additional audio output unit 152' may be provided on the backside of the terminal body. The additional audio output unit 152' may implement a stereo function together with the audio output unit 152 shown in FIG. 2A and may be used for implementation of a speakerphone mode in talking over the terminal.

A broadcast signal receiving antenna 116 may be additionally provided at the lateral side of the terminal body as well as an antenna for communication or the like. The antenna 116 may be considered a portion of the broadcast receiving module 111 (see FIG. 1) and may be retractably provided on the terminal body.

The power supply unit 190 for supplying a power to the mobile terminal 100 may be provided to the terminal body. The power supply unit 190 may be built within the terminal body. Alternatively, the power supply unit 190 may be detachably and attachably connected to the terminal body.

FIG. 2b also shows a touchpad 135 for detecting a touch that is additionally provided on the rear case 102. The touchpad 135 may be configured in a light transmissive type like the display 151. If the display 151 outputs visual information from both faces, the display 151 may recognize visual information via the touchpad 135 as well. The information outputted from both of the faces may be controlled by the touchpad 135. Alternatively, a display may be further provided to the touchpad 135 so that a touch screen may also be provided to the rear case 102.

The touchpad 135 may be activated by interconnecting with the display unit 151 of the front case 101. The touchpad 135 may be provided in rear of the display unit 151 in parallel to one another. The touchpad 135 may have a size equal to or less than a size of the display unit 151.

In the following description of a method for reproducing sound in a terminal according to the present disclosure, a method of obtaining position information of sound that is obtained by using at least two microphones will be explained, referring to FIGS. 3 and 7.

Figure 3:
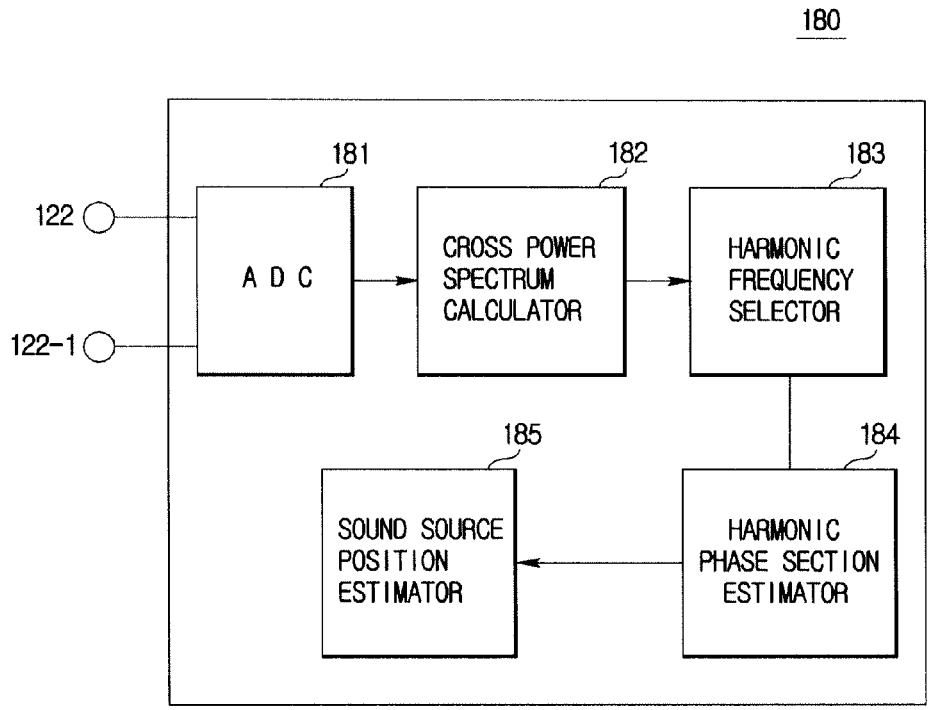
FIG. 3 is a detailed block diagram of a controller illustrating a sound source processing according to a first exemplary embodiment of the present disclosure.

FIG. 3 is a detailed block diagram of a controller illustrating a sound source processing according to a first exemplary embodiment of the present disclosure.

Referring to FIG. 3, the controller 180 may include a microphone 122, an ADC (analog-to-digital converter. 181), a cross spectrum calculator 182, a harmonic frequency selector 183, a harmonic phase section estimator 184 and a sound source position estimator 185.

The microphone 122 is a device configured to receive a sound signal transmitted from outside and convert the signal to an electrical signal, and at least two more microphones 122, 122-1 may be provided. The algorithm estimating direction of signal using the signal received through the microphones 122, 122-1 is called a DOA (Direction Of Arrival).

At least two microphones 122, 122-1 are formed in a pair, and an interval between the pair of microphones 122, 122-1 must be smaller than an approximate half wavelength ($\lambda/2$, where $\lambda$ is a wavelength of reception signal) of a signal that is to be received. In a case the interval between the pair of microphones 122, 122-1 is greater than an approximate half wavelength ($\lambda/2$, where $\lambda$ is a wavelength of reception signal) of a signal that is to be received, there may occur an aliasing phenomenon to the signal.

The ADC 181 may convert the sound signal inputted through the pair of microphones 122, 122-1 to a digital signal using a pre-set sampling frequency.

The cross spectrum calculator 182 may convert two time-axis sound signals inputted from the ADC 181 using DFT (Discrete Fourier Transform) to frequency axis, perform a complex-conjugate on a second input signal out of the two converted frequency axis signals, be multiplied and seek a CPS (Cross Power Spectrum) between the two signals.

The general concept of TDOA (Time Difference Of Arrival) is such that time axis cross correlation is sought relative to each sound signal inputted from the two microphones 122, 122-1 in response to delay time and estimates the direction of arrival using the delay time where the cross correlation is maximized. However, it is difficult to obtain an accurate delay time because resolution of the cross correlation is a reverse of the sampling frequency in the actual operation.

Therefore, the CPS (Cross Power Spectrum) is generally used at the frequency axis. At this time, the CPS (Cross Power Spectrum) and cross correlation are dependent on Fourier transform. The delay time at the time axis becomes a phase component of the CPS at the frequency axis, while the cross spectrum relative to delay time ideally has a linear phase.

The harmonic frequency selector 183 is configured to select a particular frequency having a local peak greater than an ambient magnitude among the harmonic components of the CPS (Cross Power Spectrum) obtained by the cross power spectrum calculator 182.

Although there are several methods seeking harmonic frequency of the sound signal, the present disclosure uses a simple algorithm seeking a magnitude local maxima of the CPS (Cross Power Spectrum), because algorithm becomes complicated in seeking an accurate sound harmonic frequency under a circumstance where noises are abundant. The method is to select local peaks whose magnitudes of harmonic components of CPS are larger than ambient values, using the characteristic of energy being concentrated to the harmonic frequency of sound.

The harmonic phase section estimator 184 is configured to count per section harmonic components included in a plurality of pre-set delay time sections and to select a particular delay time section including the largest number of harmonic phases. To be more specific, the harmonic phase section estimator 184 may include a delay section divider, a harmonic counter and a section selector.

The delay section divider is configured to divide an entire delay time section by a pre-set uniform phase angle. The delay section divider uses phases of harmonic components selected by the harmonic frequency selector 183 to initially divide the entire phase angle from −90° to +90° to several phase angle sections in order to pre-estimate the DOA.

The harmonic counter is configured to count per section the numbers of harmonic phase components included in each section divided by the delay section divider, and the section selector is configured to determine as DOA pre-estimation a particular section including the largest number of harmonic phases responsive to results by the harmonic counter.

That is, the harmonic counter may use a phase of selected harmonic component to count phase components of harmonics per pre-divided phase angle section, and based on the counted result, the section selector may determine as the DOA pre-estimation a particular phase angle section including the largest number of harmonic phases.

The sound source position estimator 185 is configured to use harmonic components in a particular delay time section selected through the harmonic phase section estimator 184 to estimate a position of a sound source based on calculation of delay time between two input signals. The delay time between two input signals may be calculated using a GCC-PHAT (phase transform) algorithm. The GCC-PHAT (phase transform) algorithm is known art, and the present disclosure is configured to perform the GCC-PHAT operation in the selected particular delay time section.

Figure 4:
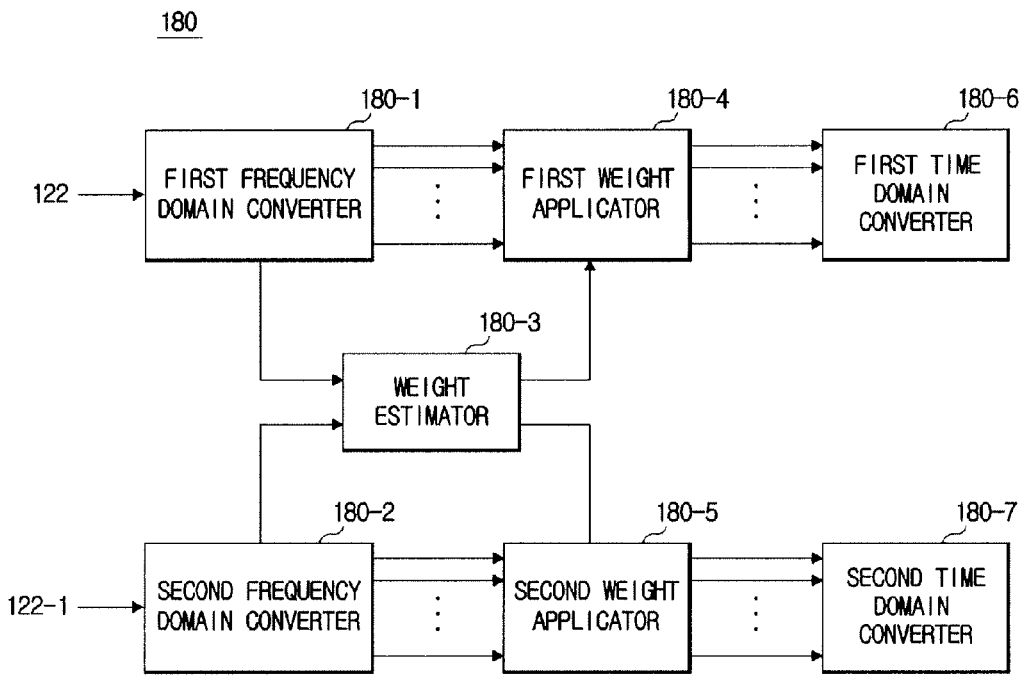
FIG. 4 is a detailed block diagram of another controller illustrating a sound source processing according to a first exemplary embodiment of the present disclosure.

FIG. 4 is a detailed block diagram of another controller illustrating a sound source processing according to a first exemplary embodiment of the present disclosure.

Referring to FIG. 4, the controller according to the first exemplary embodiment of the present disclosure may include a first frequency domain converter 180-1, a second frequency domain converter 180-2, a weight estimator 180-3, a first weight applicator 180-4, a second weight applicator 180-5, a first time domain converter 180-6 and a second time domain converter 180-7.

The first frequency domain converter 180-1 is configured to convert a signal of the first microphone 122 (which is a time domain signal) to a frequency domain signal using Fourier transform, wavelet transform (WT) and filter bank analysis. The second frequency domain converter 180-2 is also configured to convert a signal of the second microphone 122-1 to a frequency domain signal.

The weight estimator 180-3 is configured to, in order to estimate a weight, calculate a first masker component corresponding to a phase difference between sounds received from the first microphone 122 and the second microphone 122-1.

Furthermore, the weight estimator 180-3 is configured to calculate a second masker component corresponding to a magnitude difference (amplitude difference) of sound received from the first microphone 122 and the second microphone 122-1.

Still furthermore, the weight estimator 180-3 is configured to calculate a third masker component corresponding to probability in which the sound is available, where the probability in which the sound is available is a possibility in which the sound exist at a particular frame and a particular frequency. For example, although the audible frequency (AF) range is 20~20,000 Hz, the vocal frequency range is 200~7,000 Hz, such that the probability of the sound being available beyond 7,000 Hz or less than 200 Hz is zero, and the probability of the sound being available in the range of 200~7,000 Hz is 0~1.

The weight estimator 180-3 is configured to estimate the weight (masker) using one of the first masker component, the second masker component and the third masker component. That is to obtain spatial information of the signal.

The first weight applicator 180-4 is configured to apply the estimated weight to a first microphone signal and the second weight applicator 180-5 is configured to apply the estimated weight to a second microphone signal, thereby promoting the enhanced quality.

That is, the first time domain converter 180-6 is configured to convert the first microphone signal applied with the weight to a time domain signal, and the second time domain converter 180-7 is configured to convert the second microphone signal applied with the weight to a time domain signal. At this time, inverse Fourier transform, inverse wavelet transform (WT) and filter bank synthesis may be used. However, the present disclosure is not limited thereto.

As noted from the foregoing, the controller can obtain the weight (spatial information) using a phase difference of signal from the first microphone and the second microphone.

Figure 5:
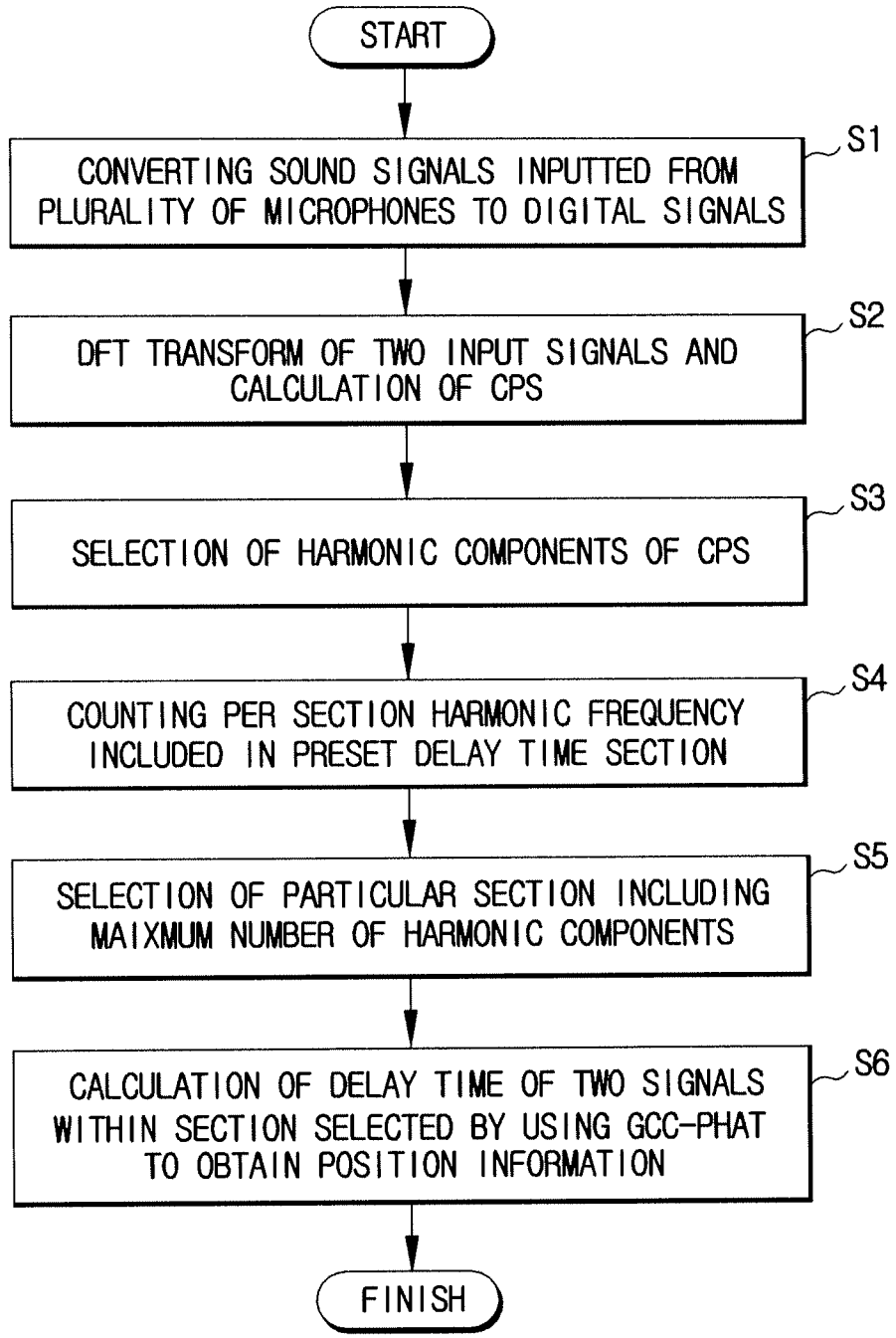
FIG. 5 is a flowchart for explaining a method for obtaining position information of an outside sound source in a terminal according to a first exemplary embodiment of the present disclosure.

FIG. 5 is a flowchart for explaining a method for obtaining position information of an outside sound source in a terminal according to a first exemplary embodiment of the present disclosure.

First, an analog-to-digital converter (ADC. 181) may receive a sound signal through at least two microphones 122, 122-1, and convert each inputted sound signal to digital signals using a preset sampling frequency (S1).

Successively, the cross spectrum calculator 182 is configured to convert the first and second input signals of time axis inputted from the ADC 181 to the first and second input signals of frequency axis through Discrete Fourier Transform (DFT). Successively, the cross spectrum calculator 182 complex-conjugates the second input signal at the frequency axis, multiplies by the first and second input signals and calculates the CPS between the first and second input signals (S2).

The harmonic frequency selector 183 selects a particular frequency having a local peak greater than an ambient magnitude among the harmonic components of the CPS (Cross Power Spectrum) obtained by the cross power spectrum calculator 182 (S3).

Thereafter, the harmonic phase section estimator 184 counts per section harmonic components included in a plurality of pre-set delay time sections and to select a particular delay time section including the largest number of harmonic phases (S4, S5).

The harmonic counter uses a harmonic phase selected from the harmonic frequency selector 183 to count per section the numbers of harmonic phase components included in each divided delay time section (S4), and the section selector selects a particular delay time section including the largest number of harmonic phases as the DOA pre-estimation section (S5). The sound source position estimator 185 calculates a delay time between two signals using the GCC-PHAT (phase transform) algorithm within the delay time section selected through the section selector (S6).

Furthermore, the method of obtaining the position information of outside sound may include a method of grasping a sound source position in consideration of path loss caused by distance using measurement of magnitude of signal, a method of using spatial spectrum, and a method of seeking the sound source position using sound source transmission time.

Now, a method for processing sound source in terminal according to the present disclosure will be illustrated in detail with reference to FIG. 6.

Figure 6:
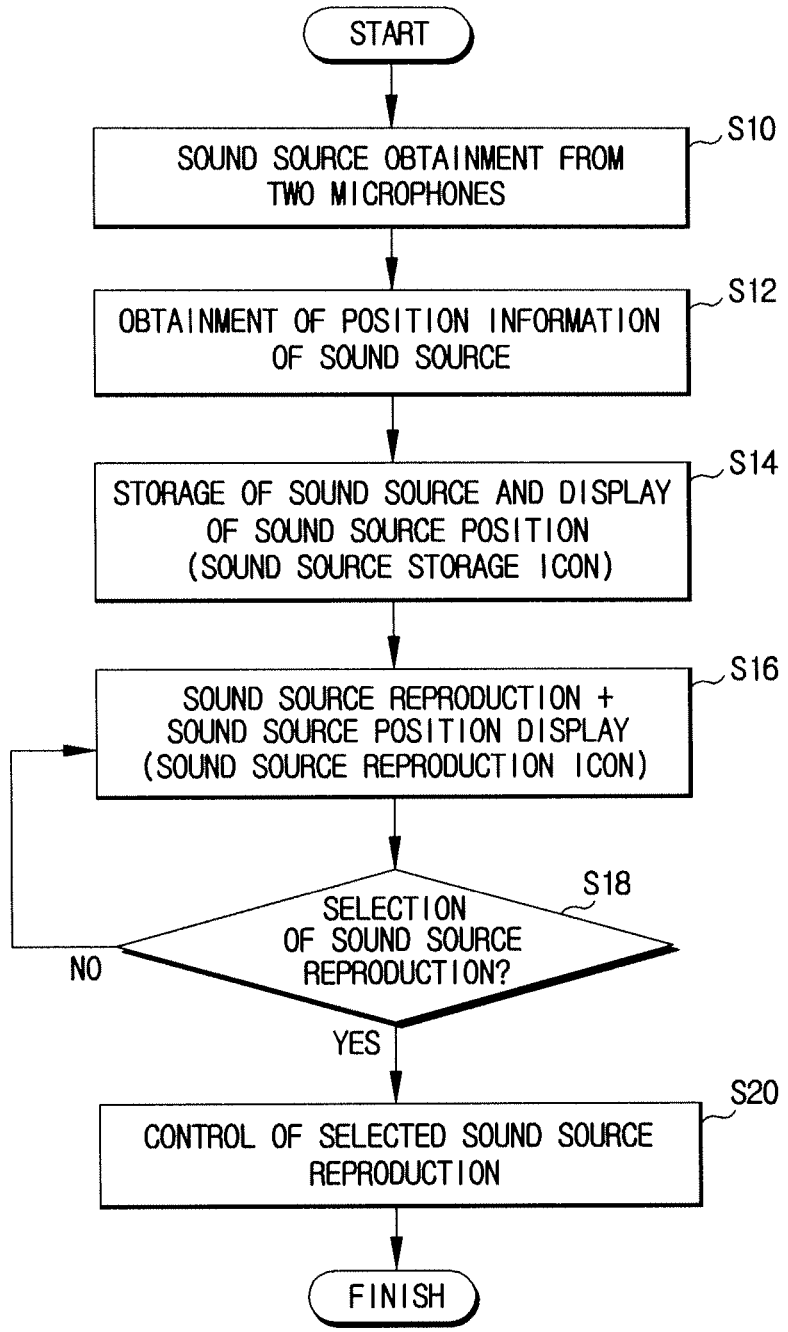
FIG. 6 is a flowchart for explaining a method for reproducing sound in a terminal according to a first exemplary embodiment of the present disclosure.

FIG. 6 is a flowchart for explaining a method for reproducing sound in a terminal according to a first exemplary embodiment of the present disclosure.

Referring to FIG. 6, an outside sound is obtained from at least two microphones formed at the terminal 100 (S10). Then, the controller 180 obtains the position information of the outside sound through the aforesaid sound source process (S12). The obtained position information is displayed on the display unit 151 as a sound source storage icon, and the user selects the sound source storage icon to selectively store or receive the sound source (S14). The sound source processing for obtaining the position information of outside sound illustrated in FIGS. 3 and 5 are to be considered exemplary only.

For example, in a case image information is to be obtained further through a camera, a face recognition program pre-stored in the memory may be utilized to obtain information on a man's face position. At this time, the position information of a man's face corresponds to position information of outside sound.

Meanwhile, in a case the outside sound and the position information of the outside sound are obtained and stored sound having the position information are reproduced, the controller 180 may control the audio output module 152 to reproduce the stored sound, and use the position information to controllably display the position of sound source on the display unit 151 as a sound source reproduction icon (S16). Successively, if the user selects the sound source reproduction icon, the reproduction of the selected sound source is controlled as a result thereof. (S18, S20).

For example, in a case a plurality of sound source reproduction icons are displayed on the display unit 151, and in a case one of the sound sources is selected, the controller 180 may discontinue the reproduction of the sound source, or control the audio output module 152 in order to reproduce only the selected sound source.

Alternatively, in a case one of the plurality of sound source reproduction icons displayed on the display unit 151 is selected, a control window capable of controlling the sound thereof may be displayed on the display unit 151, and the output of the reproduced sound may be controlled by the control window. Detailed illustration thereof will be provided with reference to FIGS. 8 and 9 in the following manner.

Figure 7:
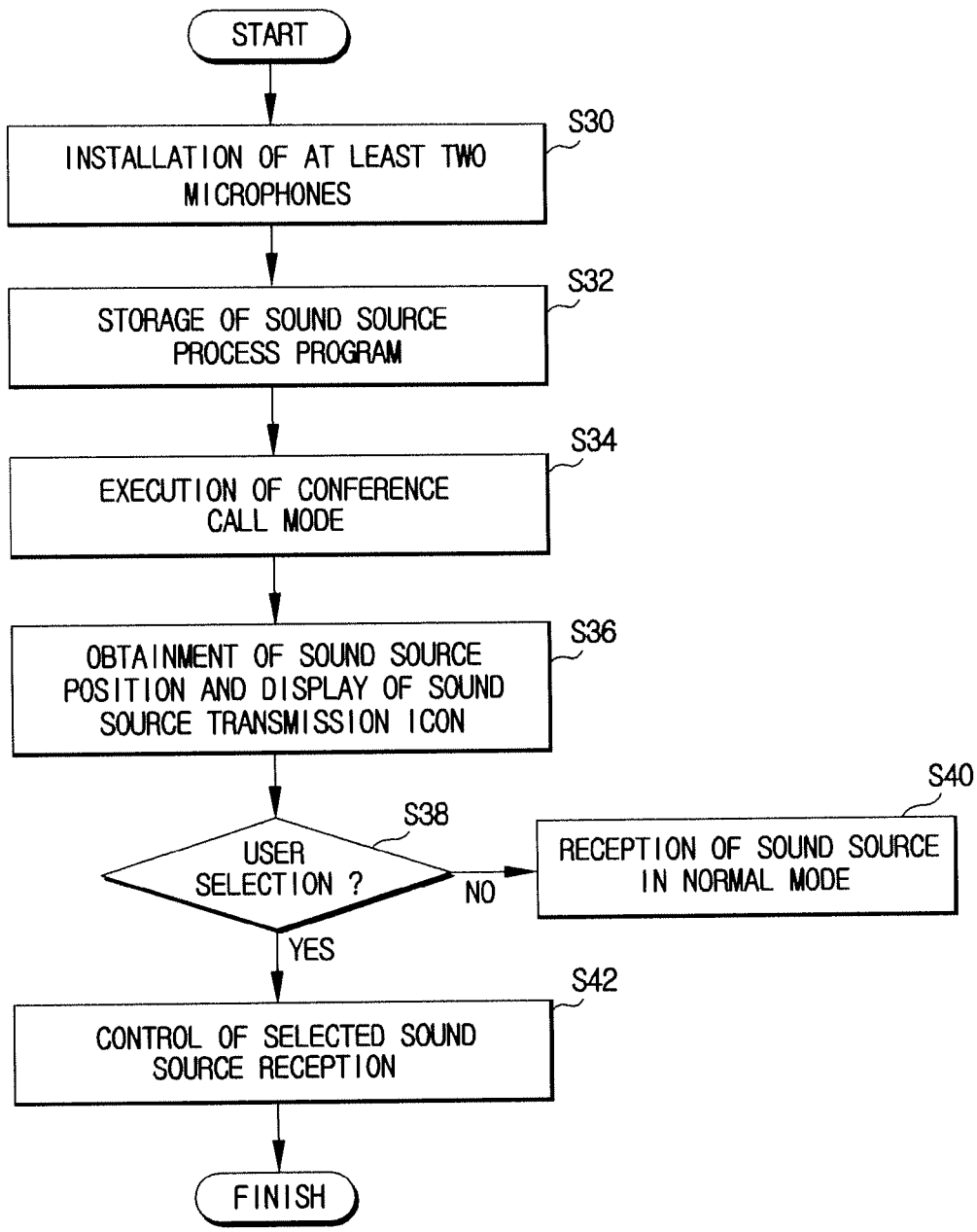
FIG. 7 is a flowchart for explaining a method for controlling a sound source in a conference call of a terminal according to a second exemplary embodiment of the present disclosure.

FIG. 7 is a flowchart for explaining a method for controlling a sound source in a conference call of a terminal according to a second exemplary embodiment of the present disclosure.

First of all, at least two microphones 122, 122-1 are installed on the terminal 100 (S30). The memory 160 is stored with a sound source process program capable of obtaining position information of sound source (S32). Under this circumstance, the user utilizes the user input unit 130 to execute the conference call mode (S34).

That is, in a case an attempt is made to make a call with another terminal, and the user enters the conference call mode, functions of microphones and speaker are reinforced not only for a user of another terminal to recognizably obtain sounds of people around the terminal but to allow the user sound of another terminal to be outputted in a loud voice, such that ambient people can recognize the user sound.

Then, the controller 180 may use the two microphones 122, 122-1 to obtain the position information of the outside sound source, which is displayed on the display unit 152 as a sound source transmission icon (S36). The position of the sound source transmission icon corresponds to the position of the outside sound source.

In a case the user selects one of the sound source transmission icons, reception of the sound source is controlled to allow only the selected sound source to be received but the reception of not-selected sound source is restricted.

That is, only the selected sound source is transmitted to another terminal through the wireless communication unit 110, and the not-selected sound source is prohibited from being transmitted to another terminal.

In a case a selection signal of the sound source icon is not generated, the sound source is received in the conventional conference call mode, where the received sound source is transmitted to another terminal through the wireless communication unit 110 (S38, S40, S42). The selection by the user of the sound source may be realized by a double click on the displayed sound source if the display unit 151 is the touch screen. Alternatively, a keypad, a trackball or a mouse may be used.

According to the aforesaid exemplary embodiment, in a case a call is made through the conference call mode, the user can input a desired person's voice only, whereby a secret conversation can be performed without letting the conversation be known to the other party.

Although the present exemplary embodiment is applied to the conference call, the embodiment is not limited thereto, and may be applied to voice recording. That is, in a case a voice recording function embedded in the terminal is used, the aforementioned method may be used to amplify and record only a particular sound source. For example, in a case the user wishes to record only an instructor's voice and remove other noises, the abovementioned method may be used to select and record only the instructor's voice. An example of the above exemplary embodiment will be explained in detail with reference to FIGS. 10 and 11.

Now, a method of reproducing an audio sound in a terminal according to the first exemplary embodiment illustrated in FIG. 6 will be expounded in detail with reference to FIGS. 8a through 9b.

Figure 8A:
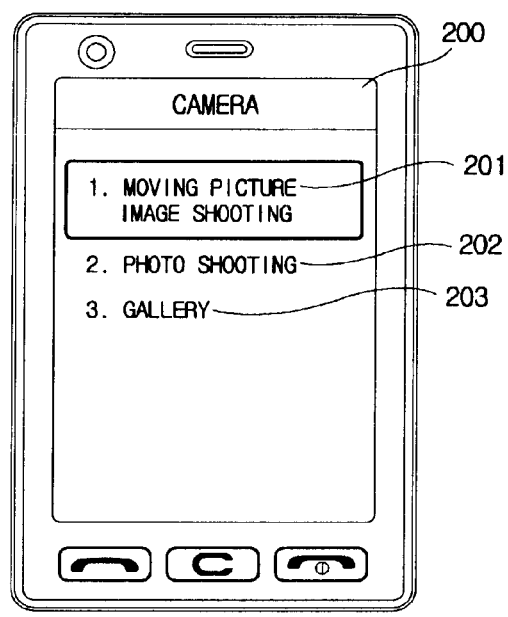
FIGS. 8a, 8b and 8c are image diagrams of a first example applied with a method for reproducing sound source in a terminal according to a first exemplary embodiment of the present disclosure.
Figure 8B:
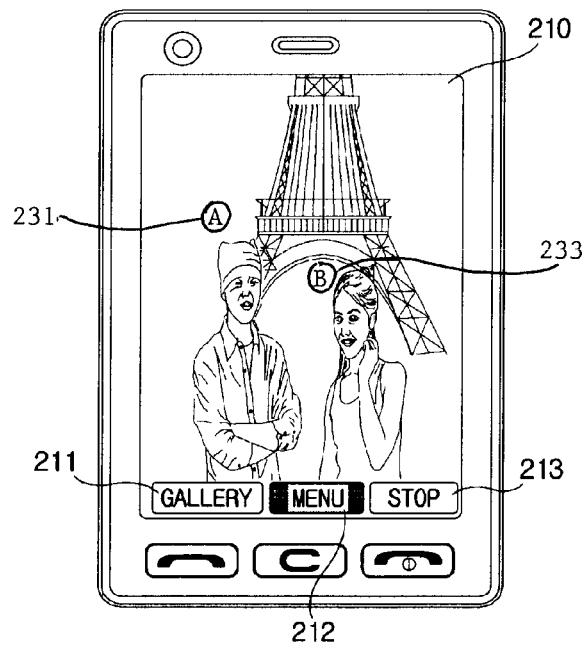
Figure 8C:
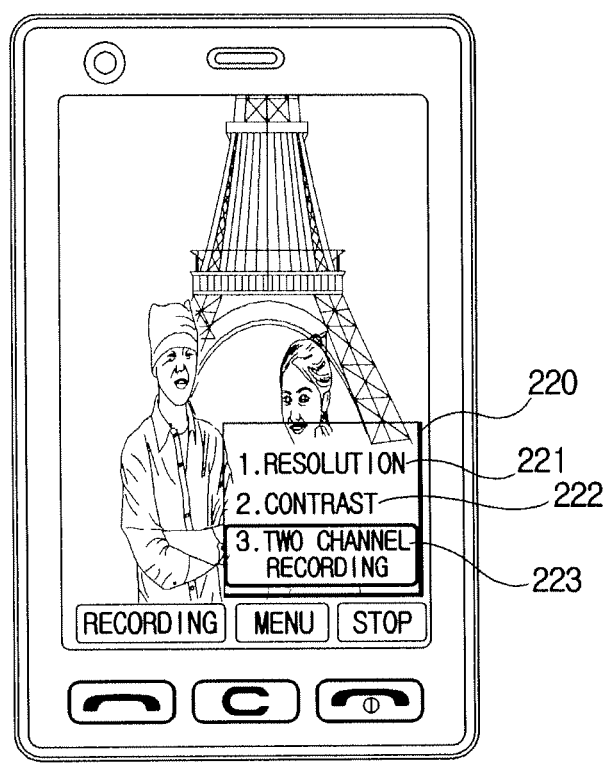
Figure 9A:
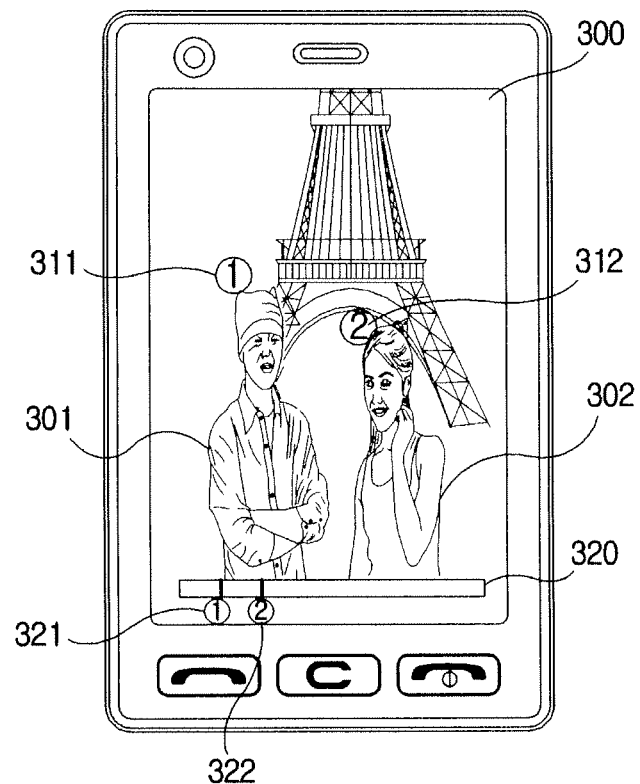
FIGS. 9a and 9b are image diagrams of a second example applied with a method for reproducing sound source in a terminal according to a second exemplary embodiment of the present disclosure.
Figure 9B:
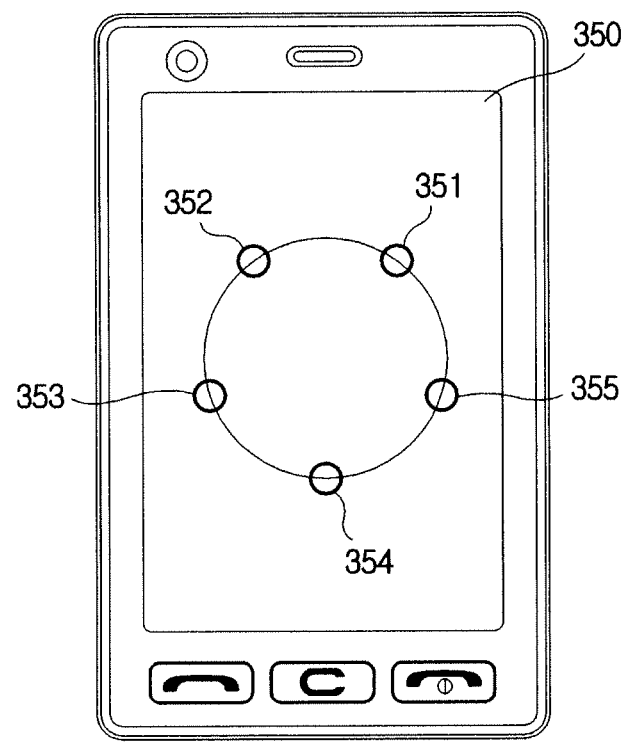

FIGS. 8a through 8c illustrate image views of a first example applied with the method of reproducing the audio sound in a terminal according to the first exemplary embodiment of the present disclosure, while FIGS. 9a and 9b illustrate image views of a second example applied with the method of reproducing the audio sound in a terminal according to the first exemplary embodiment of the present disclosure.

FIRST EXAMPLE OF FIRST EXEMPLARY EMBODIMENT

FIGS. 8a through 8c illustrate image views of a first example applied with the method of reproducing the audio sound in a terminal according to the first exemplary embodiment of the present disclosure, where FIG. 8a is illustrated with a camera menu screen 200. The camera menu screen 200 is displayed with a moving picture image shooting icon 201, a photo shooting icon 202 and a gallery icon 203.

In a case the moving picture shooting icon 201 is selected, the camera and microphones 122, 122-1 are activated to be ready for video shooting. In a case the photo shooting icon 201 is selected, the camera is activated to be ready for obtainment of a still image. In a case the gallery icon 203 is selected, the controller 180 reads out an image pre-stored in the memory and displays the pre-stored image on the display unit 151. At this time, the image may be displayed on the display unit 151 in a thumbnail format for the user's convenience.

In a case the user selects the moving picture shooting icon 201 using the user input unit 130, a pre-view screen 210 displayed with an image obtained by the camera is displayed on the display unit 151 as shown in FIG. 8b. The pre-view screen 210 may include a recording icon 211, a menu icon 212 and a still icon 213.

In a case the recording icon 211 is selected, the image obtained by the camera and the sound obtained by the at least two microphones are stored in the memory 160 or a buffer.

In a case the menu icon 212 is selected, a camera set-up window 220 is displayed as illustrated in FIG. 8c. The camera set-up window 220 is displayed with a resolution icon 221, a contrast icon 222 and a two channel recording icon 223. In a case the resolution icon 221 is selected, the user may change the resolution of the recording image. In a case the contrast icon 222 is selected, the controller 180 may display a menu capable of changing the contract of an image that is being recorded, on the display unit 151. In a case the two channel recording icon 223 is selected, the controller 180 may activate the at least two embedded microphones to obtain the outside sound. At this time, the controller 180 may analyze the outside sound to obtain the position information of the outside sound.

For example, in a case sounds of two people are obtained, position information of each sound can be obtained. At this time, the each position information may be obtained by the sound process program explained in FIGS. 3 and 5. In addition, the position information of each sound may be obtained through the face recognition program pre-stored in the memory 160. The sound thus obtained and the position information corresponding thereto are stored in the memory 160. At this time, the position information may be displayed on the display unit 151 as a sound source storage icons 231 and 233. The outside sound may be selectively received using the sound source storage icons 231 and 233.

According to the abovementioned example, two microphones are used to obtain position information of each sound and the position information can be stored in the memory in a case an image is to be recorded. In lieu of the two microphones, or together with the two microphones, the face recognition program pre-stored in the memory may be used to obtain the position information of each sound.

In the present exemplary embodiment, although function of a camcorder capable of recording an image and a sound has been exemplified, the embodiment is not limited thereto, and the embodiment may be also applied to a case where only sound is recorded.

SECOND EXAMPLE OF FIRST EXEMPLARY EMBODIMENT

FIGS. 9a and 9b illustrate image views of a second example applied with the method of reproducing the audio sound in a terminal according to the first exemplary embodiment of the present disclosure.

FIG. 9a is displayed with a reproduction screen 300 reproducing images recorded by the methods of FIGS. 8a through 8b. The reproduction screen 300 is displayed with two people 301, 302 (hereinafter referred to as sounds), sound source reproduction icons 311, 312 of each sound and a reproduction bar 320 showing a current status of image that is being reproduced.

The each person becomes a source of sound. As illustrated, a position, where a first sound 301 and a second sound 302 are generated, is displayed with a first sound source reproduction icon 311 and a second sound source reproduction icon 312. The user may select the sound source reproduction icons 311, 312 to control the reproduction of sound in the image reproduction. For example, the control is such that, in a case the first sound source reproduction icon 311 is clicked (selected), the first sound may not be outputted, and in a case the first sound source reproduction icon 311 is re-clicked, the first sound may be outputted. Alternatively, the control is such that the sound outputted in response to frequency of click may be volumed up or volumed down.

Alternatively, in a case the first sound source reproduction icon 311 is selected, a control window (not shown) capable of controlling the first sound source may be displayed on the display unit 151. The volume and reproduction speed of each sound may be controlled using the control window. Still alternatively, an STT (speech to text) function may be activated to the selected sound to allow a subtitle of each sound may be displayed on the display unit 151.

Meanwhile, the reproduction bar 320 is displayed with sound source icons 321, 322. The first and second sound source icons 321 and 322 respectively correspond to the first sound and the second sound.

In a case the user selects the first sound source icon 321, the controller 180 may reproduce sound by skipping only a section where the first sound source is reproduced. Furthermore, in a case the user selects the second sound source icon 322, the controller 180 may reproduce sound by skipping only a section where the second sound source is reproduced. At this time, not only the sound source reproduction but the corresponding moving picture may be skipped. Still furthermore, the sound may be reproduced by using the position information during the sound reproduction. That is, if the position of the sound is at the right hand side, the reproduced sound is so processed as to be seemingly heard from the right hand side.

FIG. 9b is displayed with a reproduction screen 350 that is displayed on the display unit 151 in a case the sound source is reproduced. As illustrated in FIG. 9b, the reproduction screen 350 is radially displayed with a plurality of sound source reproduction icons 351-355. The plurality of sound source reproduction icons 351-355 are arranged based on the position information.

In a case the user selects each sound source reproduction icon 351-355, the controller 180 controls the reproduction of the selected sound source reproduction icons. For example, the controller 180 may control the audio output module in such a manner that sounds of reference numerals 351 and 352 are reproduced, while sounds generated from reference numerals 353-355 are not reproduced (outputted).

That is, according to explanation of FIG. 9b, in a case a sound file such as MP3 file is reproduced, and the sound possesses position information, the sound source reproduction icon is displayed on the display unit based on the position information, and control is performed on each sound through the sound source reproduction icon.

Figure 11:
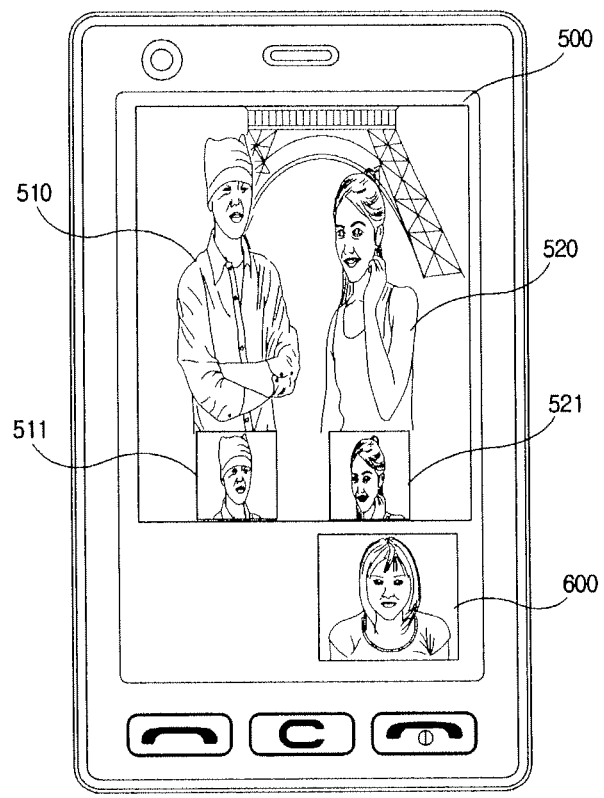
FIG. 11 is an image diagram for illustrating a second example applied with a method for conference call of a terminal according to a second exemplary embodiment of the present disclosure.

FIG. 10 is an image diagram for illustrating a first example applied with a method for conference call of a terminal according to a second exemplary embodiment of the present disclosure, and FIG. 11 is an image diagram for illustrating a second example applied with a method for conference call of a terminal according to a second exemplary embodiment of the present disclosure.

FIRST EXAMPLE OF SECOND EXEMPLARY EMBODIMENT

FIG. 10 is an image diagram for illustrating a first example applied with a method for conference call of a terminal according to a second exemplary embodiment of the present disclosure.

FIG. 10a is displayed with a conference call mode entry screen 400. At this time, a message announcing the entry into the conference call mode may be displayed on the display unit 151. Under this circumstance, a sound source scan is performed responsive to the user selection.

FIG. 10b is displayed with a sound source scan screen 410. The meaning of sound source scan is a process in which two microphones are activated to measure a distance and a direction to a sound source and to obtain the position information of the sound source. If the sound source scan is completed, the measured distance and direction to the sound source may be displayed as shown in FIG. 10c. That is, a central point of the display unit 151 is where the terminal 100 is positioned, and relative positions of sound source transmission icons 421, 422, 426, 427, 428, 429 from the central point indicate the distance and direction from the terminal.

The sound source transmission icon may be distinctively displayed into short distance sound source transmission icons 421, 422 and long distance sound source transmission icons 426-429. Furthermore, the sound source transmission icon may be displayed as avatar. Still furthermore, the user may input a predetermined name to the sound source transmission icon.

In a case there is a sound source desiring a microphone input among the sounds sources, and the user selects the sound sources 427, 429, the controller 180 receives the selected sound source through the microphone, and controls in such a way that reception of other sound sources is restricted. Furthermore, the selected sound sources 427, 429 may be displayed separately from the other remaining sound sources (see FIG. 10d).

Alternatively, the controller 180 may control in such a fashion that short distance sound source transmission icons 421, 422 are selected in response to the user selection to receive only the short distance sound source. For example, in a case a segment of an inner circle in FIG. 10c is selected, all the short distance sound sources 421, 422 may be selected and received through the microphones, while reception of the long distance sound sources 426-429 may be restricted. Conversely, in a case the long distance sound sources 426-429 are selected, only the long distance sound sources 426-429 are selected, while the short distance sound sources 421, 422 may be restricted.

Alternatively, the controller 180 may determine a main sound source out of the sound sources. That is, in a case a sound is obtained from only one sound source for a predetermined period of time, the controller 180 may control the microphones in such a way that the main sound source is automatically selected, and only the selected main sound source is received.

Alternatively, the SST function of the controller is activated, and a subtitle of the selected sound source may be displayed on the display unit 151 (not shown).

Furthermore, the controller 180 may automatically change a microphone reception mode to an inner mode. That is, the long distance sound source is determined as noise in the conference call mode. Therefore, the controller 180 may automatically change the microphone reception mode to the inner mode which is a mode of receiving only the short distance sound source. At this time, the controller 180 may change the microphone reception mode to an outer mode in response to the user selection. If the microphone reception mode is changed, an icon announcing the change of the microphone reception mode may be further displayed on the display unit 151.

Meanwhile, FIG. 10e is displayed with a screen that is further displayed with microphone reception sensitivity bars 436-439. The microphone reception sensitivity bars 436-439 indicate reception degrees of each sound source. The user may check the reception degree of the sound source inputted through the microphone reception sensitivity bars 436-439. Furthermore, reception functions of microphones may be reinforced using the microphone reception sensitivity bars 436-439.

For example, in a case one bar 436 of the microphone reception sensitivity bars 436-439 is selected and a borderline 436-1 of the bar 436 is drag and dropped, the sound reception degree of the sound source 426 corresponding to the selected bar may be strengthened or weakened. For example, in a case the bar is moved to the borderline 436-1 over a borderline 436-2, a master volume of the microphone is amplified, and a stronger sound may be obtained relative to the sound source 426 corresponding thereto.

According to the first example, not only the call quality can be improved in the conference call mode, but only the sound source necessary for the call in the conference call mode may be transmitted to the convenience and advantage of the user. Furthermore, although the present example has exemplified the conference call, it is not limited thereto, and may be applied to video call, a moving picture shooting and voice recording.

SECOND EXAMPLE OF SECOND EXEMPLARY EMBODIMENT

FIG. 11 is an image diagram for illustrating a second example applied with a method for conference call in a terminal according to a second exemplary embodiment of the present disclosure.

FIG. 11 is an example where a conference call method is applied in the video call. A video call screen illustrated in FIG. 11 may include a transmission image screen 500 transmitting to another terminal and a reception image screen 600 receiving from another terminal.

The transmission image screen 500 is displayed with a first sound source 510 and a second sound source 520. That is, the first sound source 510 may be a first person while the second sound source 520 may be a second person. Alternatively, the sound sources may be objects such as TV and an audio system instead of persons.

The controller 180 may scan the sound source to obtain the position information of the first and second sound sources during entry into the conference mode of video call, whereby sound source transmission icons 511, 521 relative to the first and second sound sources 510, 520 are generated about each sound source. If the position of the sound source on the image is changed, the controller 180, using the position information of the sound source, may change display positions of the sound source transmission icons 511, 521. The first and second sound sources 511, 521 may be further displayed with images of each sound source. That is, a partial image of sound source is generated from the image obtained from the camera, and the sound source transmission icons 511, 521 are generated using the partial image.

According to the second example, the user can more easily grasp the sound sources corresponding to the sound source transmission icons.

Now, a method of obtaining a directivity microphone effect will be described with reference to FIGS. 12*a* and 12*b* using two microphones in a terminal according to the present disclosure.

Figure 12A:
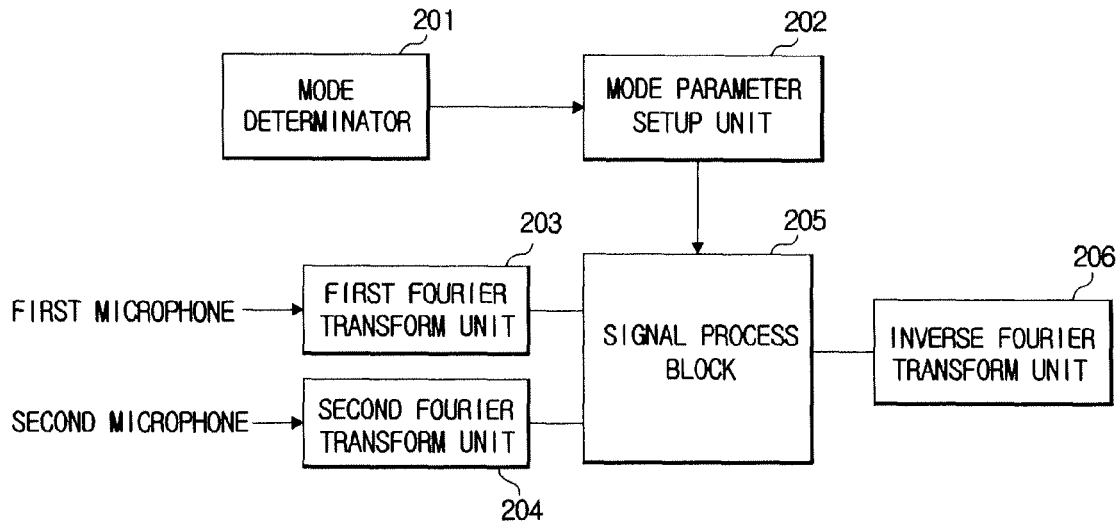
FIGS. 12a and 12b are detailed block diagrams of an audio signal processor of a terminal according to a third exemplary embodiment of the present disclosure.
Figure 12B:
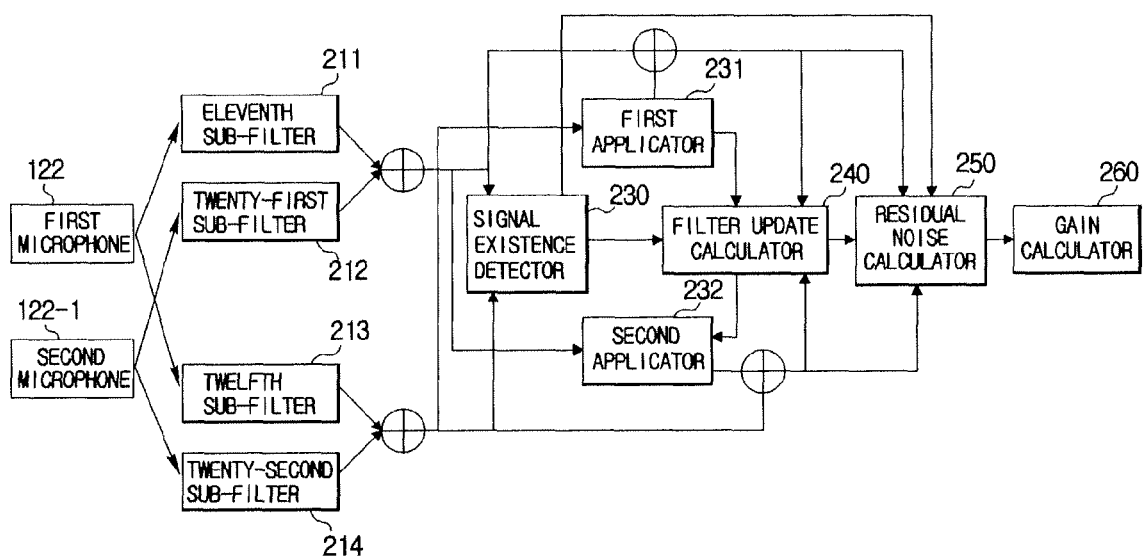

FIGS. 12*a* and 12*b* are detailed block diagrams of an audio signal processor of a terminal according to a third exemplary embodiment of the present disclosure. Referring to FIG. 12*a*, the audio signal processor 189 includes a mode determiner 201, a mode parameter set-up unit 202, a first Fourier Transform unit 203, a second Fourier Transform unit 204, a signal process block 205 and an inverse Fourier Transform unit 206.

The mode determiner 201 is a constituent element for determining a mode for processing a sound inputted from a microphone. In the present exemplary embodiment, the mode may include a directivity mode, a normal mode and noise removal mode. Furthermore, the directivity mode may include an inner focus mode and an outer focus mode.

The normal mode is a mode in which no other signal processes are normally performed and a signal from the microphone is directly collected. The noise removal mode is a mode for removing all other ambient noises except for the user sound. The directivity mode is a mode for collecting only a sound of a particular direction, where the inner focus mode concentratively collects a sound of a direction where the user is located while discouraging collection of sounds in other ambient directions. The outer focus mode, in a reverse way from the inner focus mode, concentratively collects a sound of a direction at where the user looks while discouraging collection of sounds in other ambient directions.

The mode parameter setup unit 202 is a constituent element for differently setting up parameters used for a signal process block 205 based on a mode determined by the mode determiner 201. The set-up parameters include, as illustrated in FIG. 12*b*, a sub-filter coefficient value of sub-filters 211-214, a threshold valve of a signal existence detection unit 230, a calculating formula of a filter update calculator 240, and a residual noise estimating coefficient of a residual noise calculator 250.

The first Fourier Transform unit 203 is a constituent element for transforming a signal (outside sound) from the first microphone (122, which is a time domain) to a frequency domain signal through Fourier Transform.

Although the present exemplary embodiment has used the Fourier Transform unit in transforming to the frequency domain, the embodiment is not limited thereto, and the transform to the frequency domain may be implemented through wavelet transform and filter bank analysis. The outside sound thus transformed to the frequency domain signal is transmitted to the signal process block 205, where sound process is performed based on a standard set up by the mode parameter setup unit 202.

The second Fourier Transform unit 204 is a constituent element for transforming a signal (outside sound) from the second microphone (122-1, which is a time domain) to a frequency domain signal through Fourier Transform. The outside sound thus transformed to the frequency domain signal is transmitted to the signal process block 205, where sound process is performed based on a standard set up by the mode parameter setup unit 202.

The signal process block 205 is a constituent element signal-processing the frequency domain signal received from the first Fourier Transform unit 203 and the second Fourier Transform unit 204 based on a standard set up by the mode parameter setup unit 202. The detailed configuration and operation of the signal process block 205 will be described with reference to FIG. 12*b*.

The inverse Fourier Transform unit 206 is a constituent element for transforming the frequency domain signal processed by the signal process block 205 to a time domain signal. The time domain transformed signal is transmitted to a receiver such as a speaker or an ear jack.

FIG. 12*b* is a detailed block diagram thus described. Referring to FIG. 12*b*, the signal process block 205 may include a first filter, a second filter, a signal existence detector 230, a first application filter 231, a second application filter 232, a filter update calculator 240, a residual noise calculator 250 and a gain calculator 260.

The first filter may include an eleventh sub-filter 211 and a twelfth sub-filter 213, and the second filter may include a twenty-first sub-filter 212 and a twenty-second sub-filter 214.

The eleventh sub-filter 211 and the twenty-first sub-filter 212 are filters pre-stored per mode, where a signal (sound source) in front of a camera increases, and a signal in the rear of the camera decreases under the outer focus mode, and a signal in the rear of the camera increases, and a signal in front of the camera decreases under the inner focus mode.

The twelfth sub-filter 213 and the twenty-second sub-filter 214 are filter pre-stored per mode, where a signal (sound source) in front of a camera increases, and a signal in the rear of the camera decreases under the outer focus mode, and a signal in the rear of the camera increases, and a signal in front of the camera decreases under the inner focus mode.

As illustrated in FIG. 12*b*, the eleventh sub-filter 211 and the twelfth sub-filter 213 are connected to the first microphone 122, while the twenty-first sub-filter 212 and the twenty-second sub-filter 214 are connected to the second microphone 122-1.

The signal existence detector 230 determines whether there is a desired signal per mode by comparing sizes of outputs from the first filter and the second filter, and transmits the determination to the filter update calculator 240 and the residual noise calculator 250. The output from the second filter is made to pass the first application filter 231 and to be outputted as a first filter output, wherein a signal source, which is a constituent element corresponding to an output of the second filter, is removed by the first filter.

The output of the first filter is made to pass the second application filter 232 and to be outputted as a second filter output, wherein a signal source, which is a constituent element corresponding to an output of the first filter, is removed by the second filter.

The filter update calculator 240 calculates coefficients of the first application filter and the second application filter to allow the outputs of the first filter and the second filter to be maximally separated, and transmits the calculate coefficients to the first and second filters. At this time, the method of calculating the coefficients may include a least mean square method, or an independent component analysis method.

The residual noise calculator 250 calculates a spectrum of noise in a case there is no desired signal and transmits the calculation to the gain calculator 260.

The gain calculator 260 calculates a noise removal gain per time-frequency for removing the noise.

According to the audio signal process device applied to the exemplary embodiment of the present disclosure thus configured, the sound sources received from at least two microphones can be signal-processed through the sound source process program to obtain an excellent quality of sound.

Now, a third exemplary embodiment of a method for obtaining sound source using a terminal formed with thus-described audio signal process device will be described in detail with reference to FIGS. 13 through 17.

Figure 13:
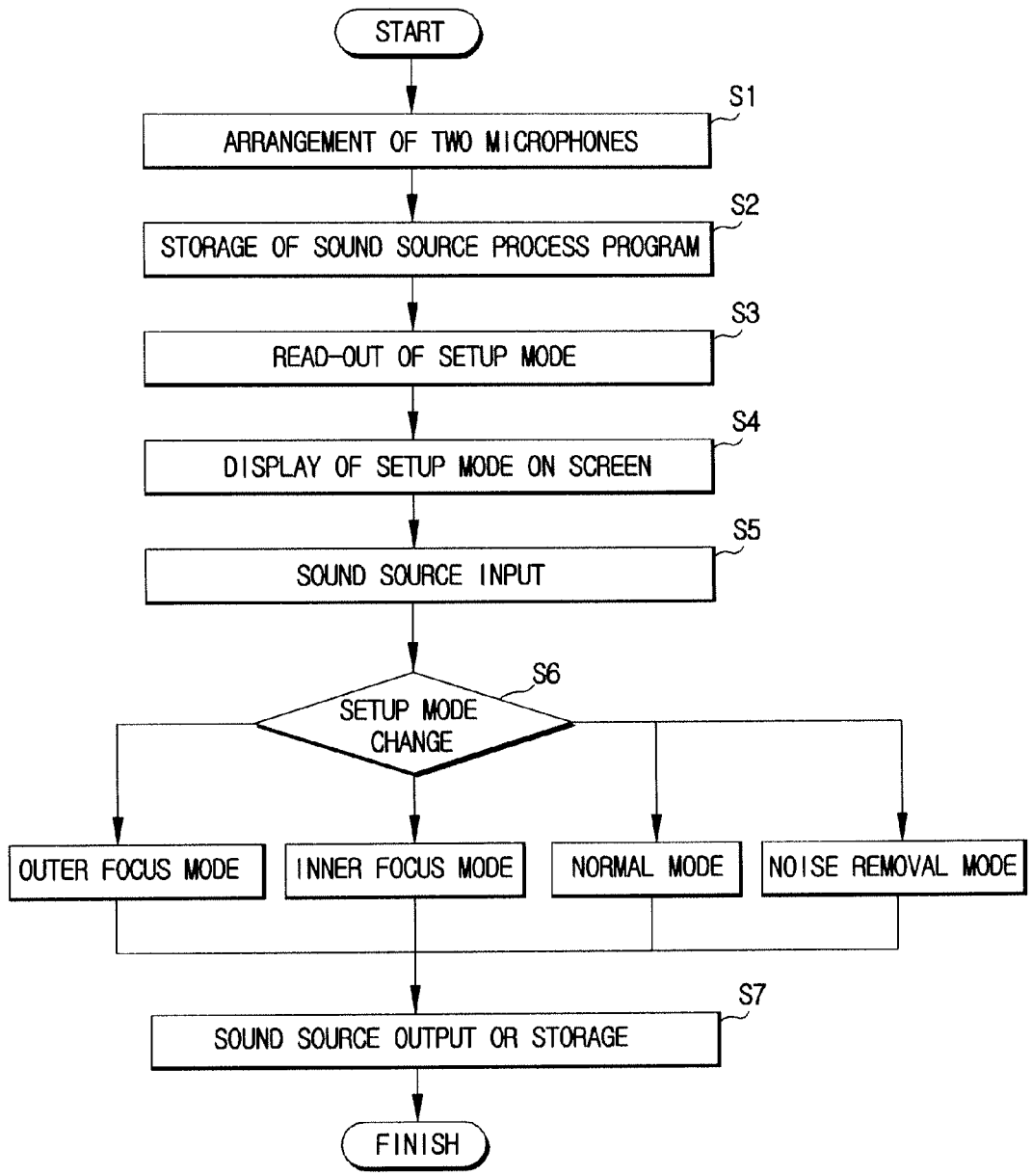
FIG. 13 is a flowchart for illustrating a method for obtaining a sound source in a terminal according to a third exemplary embodiment of the present disclosure.
Figure 16:
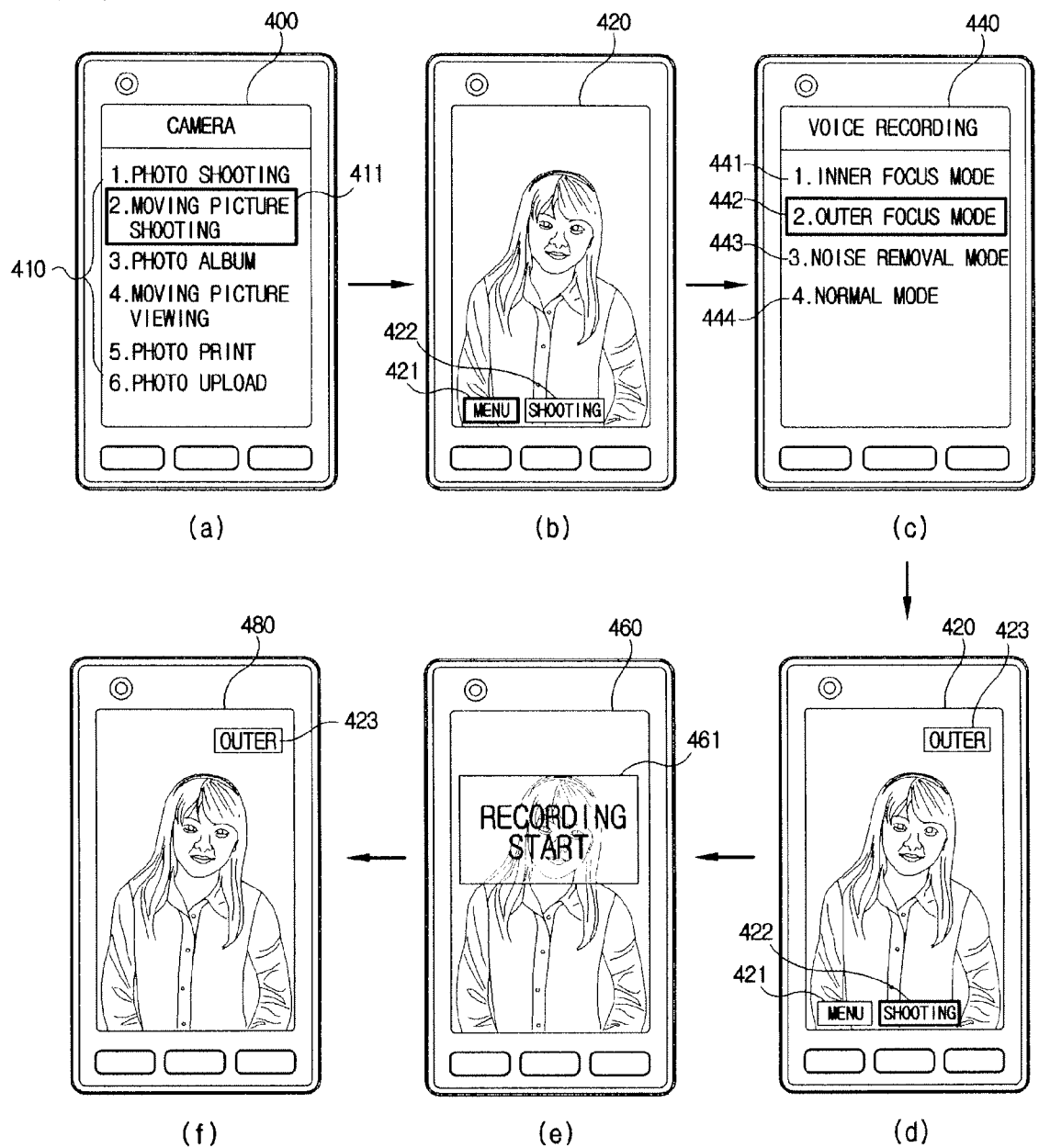
FIG. 16 is a schematic view illustrating an example applied to an image recording according to a third exemplary embodiment of the present disclosure.
Figure 17:
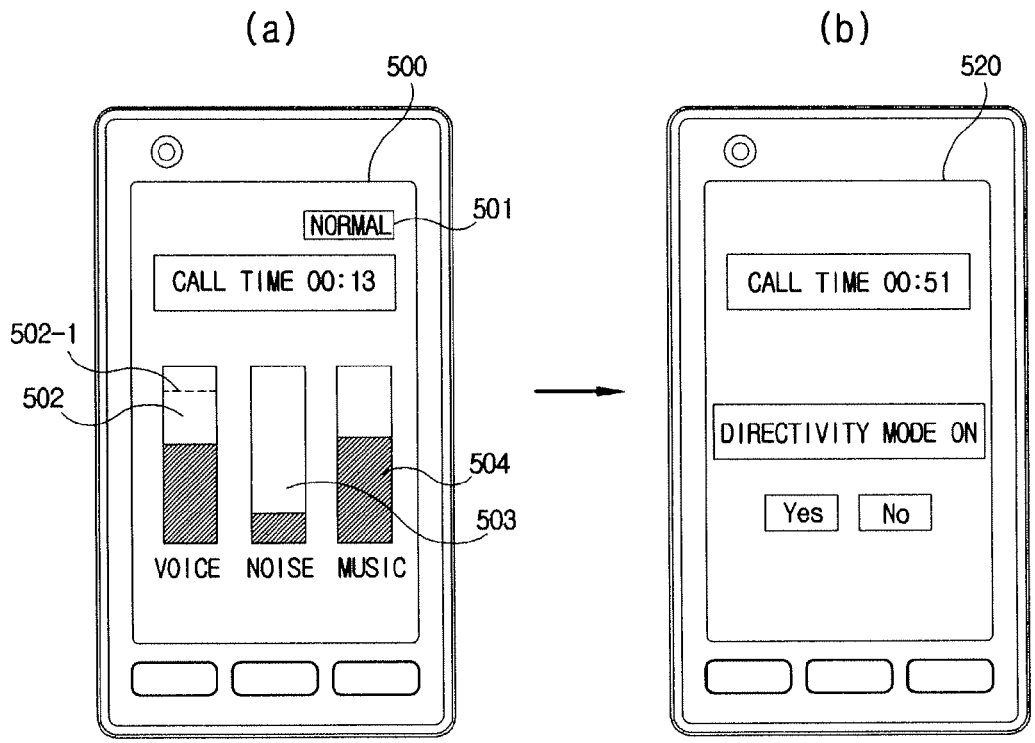
FIG. 17 is a schematic view illustrating an example applied to an image recording according to a modification of a third exemplary embodiment of the present disclosure.

FIG. 13 is a flowchart for illustrating a method for obtaining a sound source in a terminal according to a third exemplary embodiment of the present disclosure, FIG. 14 is a flowchart for illustrating a method for obtaining a sound source in a terminal according to a modification of a third exemplary embodiment of the present disclosure, FIG. 15 is a schematic view illustrating an example applied to an audio communication according to a third exemplary embodiment of the present disclosure, FIG. 16 is a schematic view illustrating an example applied to an image recording according to a third exemplary embodiment of the present disclosure, and FIG. 17 is a schematic view illustrating an example applied to an image recording according to a modification of a third exemplary embodiment of the present disclosure.

Hereinafter, although at least two microphones are exemplified, the present disclosure is not limited thereto. For example, the present disclosure may be applied to a case where one directivity microphone is utilized.

THIRD EXEMPLARY EMBODIMENT

FIG. 13 is a flowchart for illustrating a method for obtaining a sound source in a terminal according to a third exemplary embodiment of the present disclosure.

Referring to FIG. 13, first of all, at least two microphones are arranged on the terminal 100 (S1). The memory 160 is stored with a sound source process program which is a program configured to obtain sound in directivity mode, normal mode and noise removal mode (S2). Successively, in a case one of the directivity mode, normal mode and noise removal mode is set up by the user selection or pre-setup, the controller 180 reads out the set-up mode (S3). The read-out mode {directivity mode (inner focus mode, outer focus mode)}, normal mode and noise removal mode} is displayed on the display unit 151 (S4).

Under this circumstance, in a case a sound source is inputted through the microphone 122, the sound source is processed by the signal process block 205 according to the setup mode. That is, in a case the inner focus mode is set up, the controller 180 concentratively collects a sound where the user is positioned based on spatial information obtained through the sound source process program, and discourages to collect sounds of other ambient directions.

Furthermore, in a case the outer focus mode is set up, in opposition to the inner focus mode, the controller 180 concentratively collects a sound of a direction to which the user looks, and discourages to collect sounds of other ambient directions. In a case the normal mode is set up, the controller 180 collects a signal as is obtained from the microphone 180 without other signal processes. In a case the noise removal mode is set up, the controller 180 collects noiseless sounds except for the user sound (S5, S6). The sound thus processed is either stored in the memory embedded in the terminal or outputted through the audio output module 152 such as a speaker or the like (S7).

FIG. 14 is a flowchart for illustrating a method for obtaining a sound source in a terminal according to a modification of a third exemplary embodiment of the present disclosure.

As illustrated in FIG. 14, the signal process block 205 extracts a voice component, a noise component and a music component from the outside sound, and displays the extraction on the screen in a bar shape (see FIG. 17) (S11). That is, the signal process block 205 analyzes frequency characteristics of outside sound, frequency curve shape of the outside sound and amplitude on the time domain received from the microphone 122 to extract a similarity degree to a man's voice (voice analyzer), a similarity degree to a noise (noise analyzer) and a similarity degree to a music (music analyzer) and displays the extractions on the display unit 151 in a bar shape.

The controller 180 analyzes the frequency characteristics of sound source, frequency curve shape and amplitude obtained through the microphones 122, 122-1, and if it is determined that there are many noises in the outside sound source, the controller 180 displays on the display unit 151 a menu for selecting a directivity mode (S12). At this time, in a case the user selects the directivity mode, a value of the mode parameter setup unit 202 is changed, and a predetermined process is performed in the selected mode to the obtained sound source, whereby a sound source improved in sound quality can be acquired (S13, S14).

FIG. 15 is a schematic view illustrating an example applied to an audio communication according to a third exemplary embodiment of the present disclosure.

FIG. 15*a* is displayed with a "line is busy" screen 300. The screen 300 may include a call time indicator 301 and a sound obtainment mode icon 302.

As shown in FIG. 15*a*, the controller 180 in the present exemplary embodiment obtains a sound under a normal mode (directivity mode OFF) and the user communicates with a person on another terminal under the normal mode. Under this circumstance, in a case the user selects the sound obtainment mode icon 302, the controller 180 obtains the user voice (sound) under directivity mode. As a result, each parameter value of the mode parameter setup unit 202 is changed, whereby the outside sound source is obtained under the directivity mode (inner focus mode or outer focus mode). Alternatively, a noise removal mode is set up to remove the ambient noises and to collect the user voice, whereby an improvement effect of sound quality in communication can be expected.

FIG. 16 is a schematic view illustrating an example applied to an image recording according to a third exemplary embodiment of the present disclosure.

FIG. 16*a* is displayed with a camera menu screen 400. The camera menu screen 400 includes camera sub-icons 410, and one of the camera sub-icons 410 is a moving picture shooting icon 411. The user input unit 130 selects the moving picture shooting icon 411.

Successively, as shown in FIG. 16*b*, a preview screen 420 is displayed 420. The preview screen 420 may include a menu icon 421 and a shooting icon 422. At this time, the user may select the menu icon 421 to display a sound recording menu screen 440 on the display unit 151 (see FIG. 16c). The sound recording menu screen 440 may include an inner focus mode icon 441, an outer focus mode icon 442, a noise removal mode 443 and a normal mode icon 444. The user may select one of the sound recording mode icons 441~444. In a case one of the sound recording mode icons 441~444 is selected (the outer focus mode in the illustration), the controller 180 displays the pre-view screen 420 again on the display unit 151.

FIG. 16d is displayed with the pre-view screen 420 after the sound recording mode icons are selected. The pre-view screen 420 is displayed with a microphone mode identifier 423. In a case the display unit 151 is a touch screen, the user may click the microphone mode identifier 423 to change the microphone mode to the inner focus mode, the outer focus mode, the noise removal mode and the normal mode.

In a case the shooing icon 422 is selected from the pre-view screen 420 in FIG. 16d, the moving picture recording is started. FIG. 16e is displayed with a recording screen 460 on which a message window 461 announcing start of recording is displayed.

Following lapse of a predetermined period of time, in a case the recording start message window 461 disappears, the recording is progressed.

As shown in FIG. 16f, a recording progress screen 480 is displayed with the microphone mode identifier 423. As explained above, the controller 180 may change the microphone mode even during the recording process by selecting the microphone mode identifier 423.

Although the present exemplary embodiment has exemplified the moving picture recording, the embodiment is not limited thereto. For example, the embodiment may be applied to a voice recording and a video call.

and FIG. 17 is a schematic view illustrating an example applied to an image recording according to a modification of a third exemplary embodiment of the present disclosure.

FIG. 17a is displayed with a call screen 500 that displays a microphone mode identifier 501, a voice bar 502, a noise bar 503 and a music bar 504.

The bars 502~504 are such that sound received from the microphone 122 is analyzed to extract a voice component, a noise component and a music component, and the extracted components are displayed on the screen in a bar shape. That is, each analyzer (noise analyzer, voice analyzer and sound analyzer) analyzes the sound source received from the microphone to extract suitability with the noise, man's voice and music, and the extracted suitability is displayed in a bar.

The outside sound sources are analyzed through the bars and the analysis is notified to the user. If the user speaks during communication, the display of the bar is changed. If ambient noise is too loud, the graph of the noise bar 503 is raised high, whereby the change of graph is less affected even if sound is inputted during communication by the user.

At this time, in a case the user selects the microphone mode identifier 501, the controller 180 may change the mode to the directivity mode to obtain a sound of excellent quality. At this time, in a case there are too many ambient noises, the controller 180 may change the mode to the inner focus mode or noise removal mode. Furthermore, if the controller 180 determines that the noise component is greater than the setup value, a directivity mode change screen 520 is automatically displayed on the display unit 151. The user may use the screen 520 and the user input unit 130 to select the directivity mode.

Furthermore, the present exemplary embodiment uses the bars 502~504 to reinforce the reception function of the microphones. For example, in a case one of the bars 502~504 is selected to perform the drag-and-drop operation, the sound process may be reinforced or weakened based on the selected bar. For example, in a case the voice bar 502 is selected to raise a border of the bar upward by way of drag-and-drop operation, cancellation of sound except for man's audio area is strengthened to further cancel the ambient noises. Furthermore, in a case the borderline of the bar is moved over the borderline 502-1, the master volume of the microphone is amplified to obtain a greater sound.

Now, a method for obtaining a sound in a terminal formed with the abovementioned audio signal processor according to a fourth exemplary embodiment of the present disclosure will be described with reference to FIGS. 18 and 19.

Figure 18:
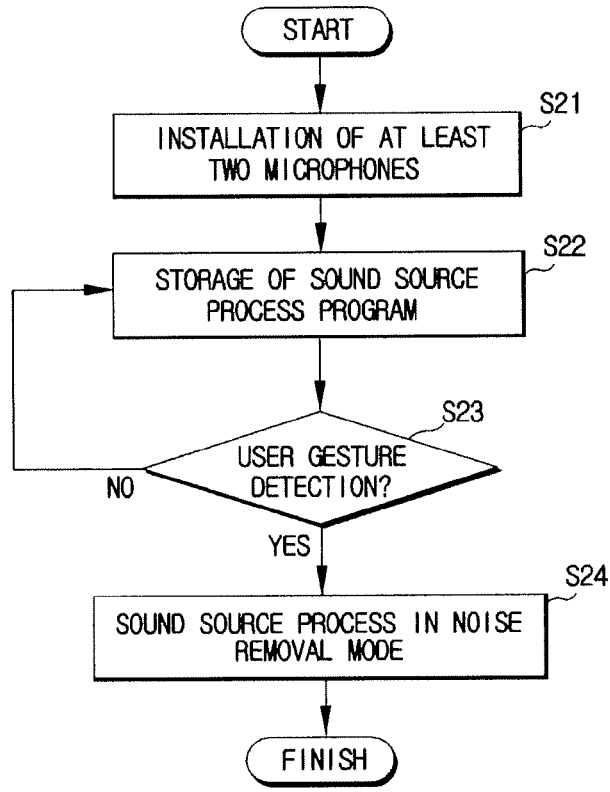
FIG. 18 is a flowchart illustrating a method for obtaining a sound in a terminal using user movement detection according to a fourth exemplary embodiment of the present disclosure.

FIG. 18 is a flowchart illustrating a method for obtaining a sound in a terminal using user movement detection according to a fourth exemplary embodiment of the present disclosure.

As depicted in FIG. 18, first of all, at least two microphones are arranged on the terminal 100 (S21). The memory 160 is stored with a sound source process program which is a program for obtaining the sound in directivity mode, the normal mode and the noise removal mode (S22). Next, the controller 180 checks whether a preset user gesture is detected (S23). If preset user gesture is detected, the noise removal mode is activated to obtain a sound free from ambient noises (S24).

Figure 19:
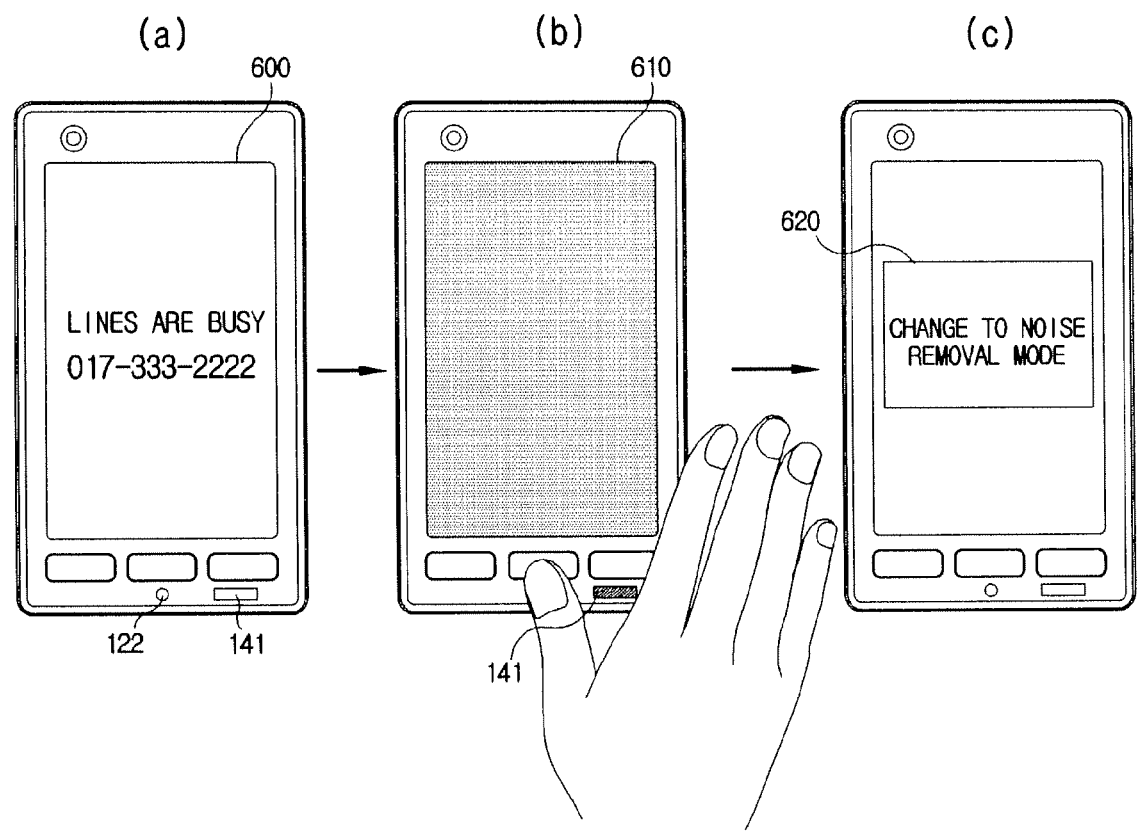
FIG. 19 is a schematic view illustrating a position of a detection sensor for detecting user movement detection according to a fourth exemplary embodiment of the present disclosure.

FIG. 19 is a schematic view illustrating a position of a detection sensor for detecting user movement detection according to a fourth exemplary embodiment of the present disclosure.

FIG. 19a is displayed with a call screen 600 which is a state where the user is communicating with a third party with another terminal. Under this circumstance, in a case the user gestures to wrap a portion with his or her hand where the microphone 122 is arranged (because it is too noisy) which is detected by the proximity sensor 141 arranged about the microphone, as shown in FIG. 19b. Then, the controller 180 automatically changes the microphone mode to noise removal mode. As shown in FIG. 19c, a message 620 announcing the change from the microphone mode to the noise removal mode is displayed on the display unit 151.

Although not shown, the sensor may be disposed at a receiver portion (an upper end portion of the terminal). In a case the user gestures to take off the terminal from the ear to check the status of the terminal because of the too noisy environment, the sensor attached at the receiver portion detects the gesture, whereby the controller 180 automatically changes the microphone mode to the noise removal mode.

According to the fourth exemplary embodiment, the controller 180 determines the gesture of the user to change the microphone mode to the noise removal mode, whereby the communication quality can be improved. Meanwhile, although the present disclosure has exemplified the audio call, the disclosure is not limited thereto. For example, the disclosure may be applied to the video call, voice recording and moving picture recording.

Furthermore, although the proximity sensor is used in the present exemplary embodiment, the disclosure is not limited thereto. For example, a sensor capable of sensing the user operation, such as a photo sensor, a distance sensor and ultrasonic sensor, may be also used.

Still furthermore, as an example of detecting the user operation, if a call quality is bad during audio call (in a case the other party says that he or she cannot hear well), and the user gestures to see the display unit by taking off the terminal from ear, the controller 180 may change the microphone mode. That is, the position detection sensor 142 detects the user gesture and the controller 180 automatically changes the microphone mode to the noise removal mode, whereby the call quality can be improved.

Although not shown in the figure, instead of automatically changing the microphone mode, a message announcing the change of the microphone mode to the user may be displayed on the display unit 151. In a case the user having checked the message instructs the microphone mode change, the microphone mode may be changed to the noise removal mode accordingly.

Hereinafter, a method for obtaining a sound in a terminal formed with the audio signal processor thus described according to a fifth exemplary embodiment of the present disclosure will be described with reference to FIGS. 20 and 21.

Figure 20:
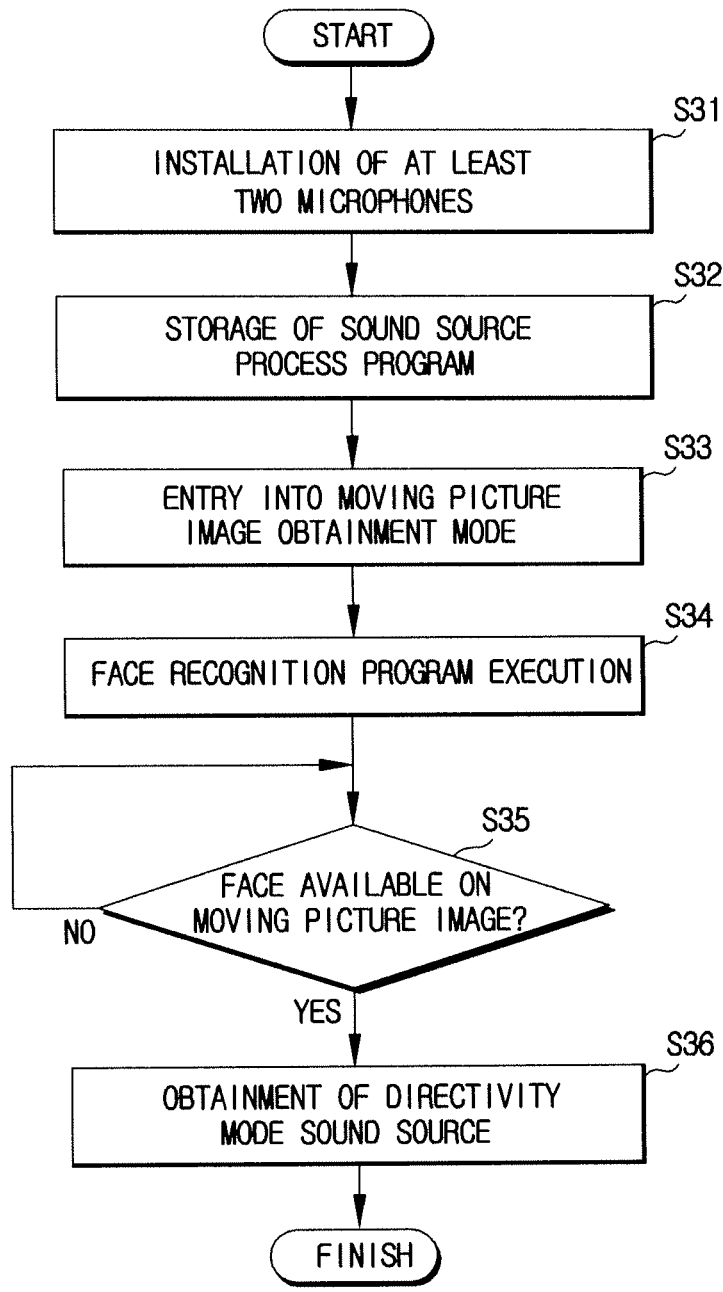
FIG. 20 is a flowchart illustrating a method for obtaining a sound in a terminal using a face recognition program according to a fifth exemplary embodiment of the present disclosure.

FIG. 20 is a flowchart illustrating a method for obtaining a sound in a terminal using a face recognition program according to a fifth exemplary embodiment of the present disclosure, and FIG. 21 is a schematic view illustrating an example applied to an image recording according to a fifth exemplary embodiment of the present disclosure.

As shown in FIG. 20, first of all, at least two microphones are installed at the terminal 100 (S31). Next, the memory 160 is stored with a sound source process program which is a program for obtaining the sound in directivity mode, the normal mode and the noise removal mode (S32). The user enters a moving picture obtainment mode using the user input unit 130 (S33). The moving picture obtainment mode is a mode for obtaining a moving picture image by operating the camera 121 and the microphone 122 on the terminal 100. For example, the moving picture obtainment mode means to operate the video call. Next, the face recognition program pre-stored in the memory is activated (S34). The controller 180 checks if a face exists on the obtained moving picture image by using the face recognition program (S35). If there is the face on the obtained moving picture image, the controller 180 changes the microphone mode to the outer focus mode. Then, the ambient sounds including the user voice sound is restricted, and the outer focus mode concentratively collects the sound of a direction to which the user looks, i.e., a man's sound captured by the camera (S36). Accordingly, the sound of a man captured by the camera can be vividly obtained.

In addition to the face recognition process in the microphone mode change, the degree of noise may be considered. That is, if it is determined that there are too many ambient noises when the camcorder function is operated, the controller 180 forthright changes to the outer focus mode, and if it is determined that there are a few ambient noises, the controller 180 discourages the change to the outer focus mode even if the face is on the moving picture image.

According to the fifth exemplary embodiment, a further improved sound quality can be obtained by automatically attenuating sounds other than a man's voice sound, using the face recognition program.

FIG. 21 is a schematic view illustrating an example applied to an image recording according to a fifth exemplary embodiment of the present disclosure.

FIG. 21a is displayed with a preview screen 700 illustrated with a preview image of video recording. The preview screen 700 may include man's faces 701, 702. Whether a man's face is on the image obtained from the camera 121 may be checked through the face recognition program stored in the memory 160.

If it is determined that the man's face is on the preview screen 700, the controller 180 drives the sound source process program to change to directivity mode. A microphone mode display window 710 is displayed on the right hand side of FIG. 21a for announcing that the outer focus mode is being operated. In a case the man's face is detected, the controller 180 automatically changes to the outer focus mode to improve the recording quality of the moving picture image.

As illustrated in FIG. 21b, in a case the image obtained by the camera 121 is a landscape image 720, the controller 180 drives the sound source process program to obtain the sound source in the inner focus mode. At this time, whether the obtained image is the landscape image may be determined by the controller 180 by analyzing absence or presence of horizon, background ratio of green or blue color and the like. A microphone mode display window 730 is displayed on the right hand side of FIG. 21b for announcing that the inner focus mode is being operated. If the sound is obtained in the inner focus mode, the sound of camera user can be vividly obtained.

Although the present exemplary embodiment exemplifies the video recording, the disclosure is not limited thereto. For example, the present disclosure may be applied to a video call.

The above-described methods can be implemented in a program recorded medium as computer-readable codes. The computer-readable media may include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling a mobile terminal, the method comprising:
    obtaining a plurality of audio sources by at least two microphones;
    determining each position information of the plurality of audio sources;
    displaying an image of the plurality of audio sources and a plurality of icons for storing the plurality of audio sources on a touchscreen of the mobile terminal, the plurality of icons being positioned near the plurality of audio sources;
    displaying a status bar on a portion of the touchscreen indicating current status of the image;
    receiving a touch input on at least one icon of the plurality of icons on the touchscreen; and
    selectively storing at least one audio source corresponding to at least one icon receiving the touch input in a memory of the mobile terminal,
    wherein a plurality of status icons is displayed on the status bar which corresponds to the plurality of the audio sources.

2. The method of claim 1, wherein the each position information of the plurality of audio sources is further determined through a face-recognition in the image of the plurality of audio sources.

3. A method for controlling a mobile terminal, the method comprising:
- displaying an image of a plurality of audio sources and a plurality of icons corresponding to the plurality of audio sources in the image on a touchscreen of the mobile terminal, the plurality of icons being positioned near the plurality of audio sources, and the plurality of audio sources and each position information of the plurality of audio sources being stored in a memory of the mobile terminal;
- displaying a status bar on a portion of the touchscreen indicating current status of the image;
- receiving a first touch input on a first icon of the plurality of icons on the touchscreen; and
- controlling an output of the plurality of audio sources in response to the first touch input,
- wherein a plurality of status icons is displayed on the status bar which corresponds to the plurality of the audio sources.

4. The method of claim 3, wherein the controlling the output includes:
- displaying the image while not outputting an audio source corresponding to the first icon.

5. The method of claim 4, further comprising:
- receiving a second touch input on the first icon of the plurality of icons on the touchscreen; and
- controlling an output of the plurality of audio sources in response to the second touch input.

6. The method of claim 5, wherein the controlling the output of the plurality of audio sources in response to the second touch input includes:
- displaying the image while outputting the audio source corresponding to the first icon.

7. The method of claim 3,
- wherein the controlling the output includes:
- controlling volume and speed of the audio source corresponding to the first icon.

8. The method of claim 3, wherein the controlling the output display includes:
- displaying a text for the audio source corresponding to the first icon while outputting the audio source corresponding to the first icon.

9. The method of claim 8, wherein the controlling the output display includes:
- outputting the audio source corresponding to the first icon based on a position information of the audio source corresponding to the first icon.

10. The method of claim 3, further comprising:
- receiving a third touch input on a status icon of the plurality of status icons; and
- displaying the image while outputting an audio source corresponding to the status icon during a section where the audio source corresponding to the status icon is reproduced.

11. The method of claim 3, further comprising:
- receiving a fourth touch input on a status icon of the plurality of status icons; and
- displaying the image by skipping a section where an audio source corresponding to the status icon is being outputted.

12. A method for controlling a mobile terminal, the method comprising:
- obtaining a plurality of audio sources by at least two microphones of the mobile terminal;
- determining distance and/or direction from the mobile terminal to the plurality of audio sources to obtain each position information of the plurality of audio sources;
- displaying an image of the plurality of audio sources and a plurality of icons corresponding to the plurality of audio sources on a touchscreen of the mobile terminal;
- displaying a status bar on a portion of the touchscreen indicating current status of the image;
- receiving a touch input on a first one icon of the plurality of icons; and
- receiving a first audio source corresponding to the first icon by the at least two microphones,
- wherein a plurality of status icons is displayed on the status bar which corresponds to the plurality of the audio sources.

13. The method of claim 12, further comprising:
- not receiving a second audio source corresponding to a second icon not receiving the touch input in the plurality of icons.

14. The method of claim 13, wherein the first icon is distinguished from the second icon by color.

15. The method of claim 12, wherein audio sources in the plurality of audio sources having a substantially same distance from the mobile terminal is displayed on a circle on the touchscreen.

16. The method of claim 15, wherein a center of the circle corresponds to a location of the mobile terminal.

17. The method of claim 12, further comprising:
- displaying a bar whose borderline indicates reception degree of the first audio source near the first icon on the touchscreen.

18. The method of claim 17, further comprising:
- receiving a touch-and-drag input on the borderline; and
- changing the reception degree of the first audio source in response to the touch-and-drag input.

* * * * *